United States Patent
Manolakos et al.

(10) Patent No.: US 11,025,384 B2
(45) Date of Patent: Jun. 1, 2021

(54) JOINT DETERMINATION OF DEMODULATION AND CHANNEL STATE INFORMATION REFERENCE SIGNALS

(71) Applicant: QUALCOMM Incorporated, San Diego, CA (US)

(72) Inventors: Alexandros Manolakos, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/053,672

(22) Filed: Aug. 2, 2018

(65) Prior Publication Data

US 2019/0044679 A1    Feb. 7, 2019

(30) Foreign Application Priority Data

Aug. 4, 2017 (GR) .............................. 20170100370

(51) Int. Cl.
*H04L 5/00* (2006.01)
*H04W 72/04* (2009.01)

(52) U.S. Cl.
CPC .......... *H04L 5/0048* (2013.01); *H04L 5/0051* (2013.01); *H04W 72/042* (2013.01); *H04L 5/0007* (2013.01)

(58) Field of Classification Search
CPC ... H04L 5/0007; H04L 5/0048; H04L 5/0051; H04W 72/042
See application file for complete search history.

(56) References Cited

U.S. PATENT DOCUMENTS

| 9,491,757 B2* | 11/2016 | Wu | H04L 5/0048 |
| 2012/0088458 A1* | 4/2012 | Nogami | H04B 7/0645 |
| | | | 455/67.11 |
| 2013/0064215 A1* | 3/2013 | Gao | H04L 5/0023 |
| | | | 370/330 |

(Continued)

OTHER PUBLICATIONS

International Search Report and Written Opinion—PCT/US2018/045225—ISA/EPO—dated Oct. 18, 2018.

(Continued)

*Primary Examiner* — Steven H Nguyen
(74) *Attorney, Agent, or Firm* — Kevin M. Donnelly

(57) ABSTRACT

The described techniques provide for mapping one or more demodulation reference signal (DMRS) patterns to one or more available channel state information reference signal (CSI-RS) resources. A UE receiving DMRS and CSI-RS signals may determine CSI-RS resources, or reduce its search space for identification of CSI-RS transmissions, based on a DMRS pattern for a transmission. In some cases, a base station may transmit DMRS patterns and a mapping between DMRS patterns and CSI-RS resources to a UE. CSI-RS resources may be configured semi-statically or dynamically by a base station. In some cases, one or more null DMRS patterns may be configured and mapped to CSI-RS resources, and a base station may use a null DMRS pattern for one UE to transmit a DMRS to a different UE, and both UEs may measure channel state information based on an associated CSI-RS transmitted in mapped CSI-RS resources.

4 Claims, 23 Drawing Sheets

(56) References Cited

U.S. PATENT DOCUMENTS

| | | | |
|---|---|---|---|
| 2013/0064216 A1* | 3/2013 | Gao | H04L 5/0053 370/330 |
| 2014/0254516 A1* | 9/2014 | Lee | H04J 11/0023 370/329 |
| 2016/0087774 A1* | 3/2016 | Guo | H04L 5/0051 370/329 |
| 2017/0006589 A1* | 1/2017 | Park | H04W 72/005 |
| 2017/0208572 A1* | 7/2017 | Park | H04L 5/0094 |
| 2018/0014283 A1* | 1/2018 | You | H04L 5/0094 |
| 2018/0091196 A1* | 3/2018 | Frenne | H04L 5/005 |
| 2019/0158206 A1* | 5/2019 | Li | H04J 13/0048 |

OTHER PUBLICATIONS

Samsung: "Remaining Issues on quasi co-location between CSI-RS, CRS and DMRS", 3GPP Draft, R1-124558 Remaining Issues on Quasi Co-Location, 3rd Generation Partnership Project (3GPP), Mobile Competence Centre, 650, Route Des Lucioles, F-06921 Sophia-Antipolis Cedex, France, vol. RAN WG1, No. San Diego, USA, 20121008-20121012, Oct. 12, 2012 (Oct. 12, 2012), XP050662440, pp. 1-5, Retrieved from the Internet: URL:http://www.3gpp.org/ftp/tsg_ran/WG1_RL1/TSGR1_70b/Docs/ [retrieved on Oct. 12, 2012].

ZTE et al., "Way Forward on DCI signalling in format 20 for POSCH RE mapping and quasi-co-location of CSI-RS and DMRS", 3GPP Draft, R1-125316_WF DCI2D, 3rd Generation Partnership Project (3GPP), Mobile Competence Centre, 650, Route Des Lucioles, F-06921 Sophia-Antipolis Cedex, France, vol. RAN WG1, No. New Orleans, USA, 20121112-20121116, Nov. 15, 2012 (Nov. 15, 2012), XP050663158, 2 Pages, Retrieved from the Internet: URL:http://www.3gpp.org/ftp/tsg_ran/WG1_RL1/TSGR1_71/Docs/ [retrieved on Nov. 15, 2012].

ZTE et al., "Way Forward on downlink control signalling for PDSCH RE mapping and quasi-co-location of CSI-RS and DMRS for TM10", 3GPP Draft; R1-124623, 3rd Generation Partnership Project (3GPP), Mobile Competence Centre; 650, Route Des Lucioles; F-06921 Sophia-Antipolis Cedex; France vol. RAN WG1, no. San Diego, USA; 20121008-20121012 Oct. 12, 2012 (Oct. 12, 2012), pp. 1-4, XP050662485, Retrieved from URL: http://www.3gpp.org/ftp/tsg_ran/WG1_RL1/TSGR1_70b/Docs [retrieved on Oct. 12, 2012].

* cited by examiner

▨ Control
▩ DMRS

JOINT DETERMINATION OF DEMODULATION AND CHANNEL STATE INFORMATION REFERENCE SIGNALS

CROSS REFERENCES

The present Application for Patent claims priority to Greece Patent Application No. 2017/0100370 by Manolakos, et al., entitled "Joint Determination of Demodulation and Channel State Information Reference Signals," filed Aug. 4, 2017, assigned to the assignee hereof, and expressly incorporated herein.

BACKGROUND

The following relates generally to wireless communication and to joint determination of demodulation and channel state information reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support joint determination of demodulation and channel state information reference signals. Generally, the described techniques provide for mapping one or more demodulation reference signal (DMRS) patterns to one or more available channel state information reference signal (CSI-RS) resources. A UE receiving DMRS and CSI-RS signals may thus determine CSI-RS resource or reduce its search space for identification of CSI-RS transmissions based on a DMRS pattern for a transmission. In some cases, a base station may transmit DMRS patterns and a mapping between DMRS patterns and CSI-RS resources to a user equipment (UE). CSI-RS resources may be configured semi-statically or dynamically by a base station. In some cases, one or more null DMRS patterns may be configured and mapped to CSI-RS resources, and a base station may use a null DMRS pattern for one UE to transmit a DMRS to a different UE, and both UEs may measure channel state information based on an associated CSI-RS transmitted in mapped CSI-RS resources. In some other cases, one or more DMRS patterns may be precluded for DMRS transmissions, based in part on a CSI-RS configuration. In such cases, the mapping between the DMRS patterns and CSI-RS resources may indicate the constraints on DMRS.

A method of wireless communication is described. The method may include identifying a set of DMRS patterns for use at a UE and a set of available CSI-RS resources, receiving DCI indicating one or more of the DMRS patterns based on a mapping between one or more of the set of DMRS patterns and one or more of the set of available CSI-RS resources that are associated with the one or more DMRS patterns, and receiving one or more of a DMRS or a CSI-RS based on the received DCI and the mapping.

An apparatus for wireless communication is described. The apparatus may include a processor, memory in electronic communication with the processor, and instructions stored in the memory. The instructions may be executable by the processor to cause the apparatus to identify a set of DMRS patterns for use at a UE and a set of available CSI-RS resources, receive DCI indicating one or more of the DMRS patterns based on a mapping between one or more of the set of DMRS patterns and one or more of the set of available CSI-RS resources that are associated with the one or more DMRS patterns, and receive one or more of a DMRS or a CSI-RS based on the received DCI and the mapping.

Another apparatus for wireless communication is described. The apparatus may include means for identifying a set of DMRS patterns for use at a UE and a set of available CSI-RS resources, receiving DCI indicating one or more of the DMRS patterns based on a mapping between one or more of the set of DMRS patterns and one or more of the set of available CSI-RS resources that are associated with the one or more DMRS patterns, and receiving one or more of a DMRS or a CSI-RS based on the received DCI and the mapping.

A non-transitory computer-readable medium storing code for wireless communication is described. The code may include instructions executable by a processor to identify a set of DMRS patterns for use at a UE and a set of available CSI-RS resources, receive DCI indicating one or more of the DMRS patterns based on a mapping between one or more of the set of DMRS patterns and one or more of the set of available CSI-RS resources that are associated with the one or more DMRS patterns, and receive one or more of a DMRS or a CSI-RS based on the received DCI and the mapping.

Some examples of the method, apparatuses, and non-transitory computer-readable medium described herein may further include operations, features, means, or instructions for receiving an indication of a first DMRS pattern for a first downlink transmission, identifying a first subset of CSI-RS resources that may be mapped to the first DMRS pattern and determining first CSI-RS resources associated with the first downlink transmission based on the first subset of CSI-RS resources.

In some examples of the method, apparatuses, and non-transitory computer-readable medium described herein, the determining the first CSI-RS resources may include operations, features, means, or instructions for receiving an indication of the first CSI-RS resources within the first subset of CSI-RS resources in control information associated with the first downlink transmission.

In some examples of the method, apparatuses, and non-transitory computer-readable medium described herein, the indication of the first CSI-RS resources may be received dynamically in DCI associated with the first downlink transmission.

Some examples of the method, apparatuses, and non-transitory computer-readable medium described herein may further include operations, features, means, or instructions for semi-statically receiving configuration information including the set of DMRS patterns and the set of available CSI-RS resources.

In some examples of the method, apparatuses, and non-transitory computer-readable medium described herein, the configuration information may be received in RRC signaling.

In some examples of the method, apparatuses, and non-transitory computer-readable medium described herein, the set of DMRS patterns includes a null DMRS pattern mapped to one or more CSI-RS resources.

In some examples of the method, apparatuses, and non-transitory computer-readable medium described herein, the receiving the one or more of the DMRS or CSI-RS may include operations, features, means, or instructions for receiving a CSI-RS in a downlink transmission over the one or more CSI-RS resources mapped to the null DMRS pattern, and where a DMRS may be not received in the downlink transmission.

In some examples of the method, apparatuses, and non-transitory computer-readable medium described herein, the set of DMRS patterns includes a set of null DMRS patterns.

In some examples of the method, apparatuses, and non-transitory computer-readable medium described herein, the set of null DMRS patterns may be received in a cell-specific configuration of all UEs within a cell.

Some examples of the method, apparatuses, and non-transitory computer-readable medium described herein may further include operations, features, means, or instructions for receiving an indication of one or more zero power (ZP) CSI-RS resources that may be configured independently of the DMRS patterns.

Some examples of the method, apparatuses, and non-transitory computer-readable medium described herein may further include operations, features, means, or instructions for determining a configuration of the CSI-RS based on an associated DMRS pattern and determining frequency resources of the CSI-RS based on associated DMRS frequency resources.

A method of wireless communication is described. The method may include identifying a set of DMRS patterns for a UE and a set of available CSI-RS resources for the UE, determining a mapping between one or more of the DMRS patterns and one or more of the set of available CSI-RS resources, transmitting DCI indicating one or more of the DMRS patterns based on the determined mapping, and transmitting one or more of a DMRS or CSI-RS based on the transmitted DCI and the determined mapping.

An apparatus for wireless communication is described. The apparatus may include a processor, memory in electronic communication with the processor, and instructions stored in the memory. The instructions may be executable by the processor to cause the apparatus to identify a set of DMRS patterns for a UE and a set of available CSI-RS resources for the UE, determine a mapping between one or more of the DMRS patterns and one or more of the set of available CSI-RS resources, transmit DCI indicating one or more of the DMRS patterns based on the determined mapping, and transmit one or more of a DMRS or CSI-RS based on the transmitted DCI and the determined mapping.

Another apparatus for wireless communication is described. The apparatus may include means for identifying a set of DMRS patterns for a UE and a set of available CSI-RS resources for the UE, determining a mapping between one or more of the DMRS patterns and one or more of the set of available CSI-RS resources, transmitting DCI indicating one or more of the DMRS patterns based on the determined mapping, and transmitting one or more of a DMRS or CSI-RS based on the transmitted DCI and the determined mapping.

A non-transitory computer-readable medium storing code for wireless communication is described. The code may include instructions executable by a processor to identify a set of DMRS patterns for a UE and a set of available CSI-RS resources for the UE, determine a mapping between one or more of the DMRS patterns and one or more of the set of available CSI-RS resources, transmit DCI indicating one or more of the DMRS patterns based on the determined mapping, and transmit one or more of a DMRS or CSI-RS based on the transmitted DCI and the determined mapping.

Some examples of the method, apparatuses, and non-transitory computer-readable medium described herein may further include operations, features, means, or instructions for transmitting an indication of a first DMRS pattern for a first downlink transmission, identifying a first subset of CSI-RS resources that may be mapped to the first DMRS pattern, selecting a first CSI-RS resource based on the first subset of CSI-RS resources that may be mapped to the first DMRS pattern and transmitting an indication of the first CSI-RS resource.

In some examples of the method, apparatuses, and non-transitory computer-readable medium described herein, the indication of the first CSI-RS resource may be transmitted dynamically in DCI associated with the first downlink transmission.

Some examples of the method, apparatuses, and non-transitory computer-readable medium described herein may further include operations, features, means, or instructions for semi-statically transmitting in RRC signaling configuration information including the set of DMRS patterns and the set of available CSI-RS resources.

In some examples of the method, apparatuses, and non-transitory computer-readable medium described herein, the set of DMRS patterns includes a null DMRS pattern mapped to one or more CSI-RS resources.

Some examples of the method, apparatuses, and non-transitory computer-readable medium described herein may further include operations, features, means, or instructions for transmitting a CSI-RS in a downlink transmission over the one or more CSI-RS resources mapped to the null DMRS pattern, and where a DMRS may be not transmitted in the downlink transmission.

In some examples of the method, apparatuses, and non-transitory computer-readable medium described herein, the set of DMRS patterns includes a set of null DMRS patterns that may be configured at a set of UEs in a cell-specific configuration.

Some examples of the method, apparatuses, and non-transitory computer-readable medium described herein may further include operations, features, means, or instructions for configuring one or more zero power (ZP) CSI-RS resources at the UE independently of the DMRS patterns.

Some examples of the method, apparatuses, and non-transitory computer-readable medium described herein may further include operations, features, means, or instructions for determining a configuration of the CSI-RS based on an associated DMRS pattern and determining frequency resources of the CSI-RS based on associated DMRS frequency resources.

DETAILED DESCRIPTION

Figure 1:
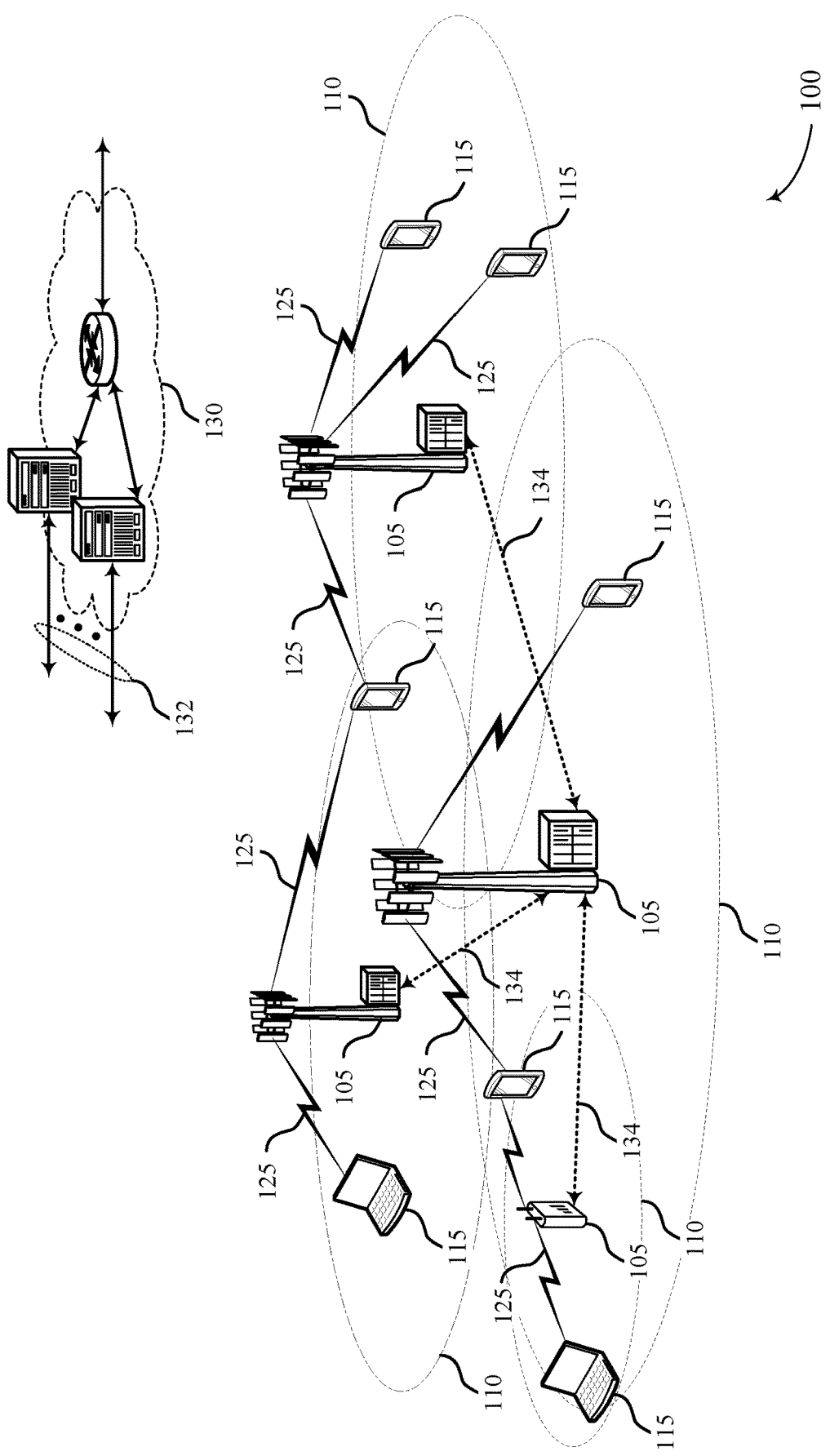
FIG. 1 illustrates an example of a system for wireless communication that supports joint determination of demodulation and channel state information reference signals in accordance with aspects of the present disclosure.

In some wireless communication systems, a transmitter may transmit a demodulation reference signal (DMRS) that a receiver may use to demodulate other transmissions from the transmitter. In some systems, such DMRS transmissions may be transmitted using specified resources available for transmission (e.g., in a middle symbol of a transmission slot). In some next generation wireless communication systems (e.g., a 5G or NR system), various different DMRS patterns may be used for DMRS transmissions, in which different resources (i.e., DMRS resource elements) may be used within a wireless subframe or slot. In such cases, a base station may configure a particular DMRS pattern or DMRS patterns for data demodulation, which in some cases may support a front-loaded DMRS pattern in which a DMRS transmission is located relatively early in a transmission (e.g., in a first symbol following a control information symbol). Such variable or configurable resources for DMRS transmissions may have an impact on other reference signals, such as a channel state information reference signal (CSI-RS). Thus, a receiver such as a user equipment (UE), may need to be aware of both a DMRS configuration and a CSI-RS configuration in order to properly receive one or both reference signals.

Various techniques discussed herein provide for mapping one or more DMRS patterns to one or more available CSI-RS resources. A UE receiving DMRS and CSI-RS signals may thus determine CSI-RS resources, or reduce a search space for identification of CSI-RS transmissions, based on a DMRS pattern. In some cases, a base station may transmit DMRS patterns and a mapping between DMRS patterns and CSI-RS resources to a user equipment (UE). The base station may then transmit (e.g., in downlink control information (DCI) or radio resource control (RRC) signaling) an indication of a DMRS pattern and an indication of a selected CSI-RS resource (e.g., an index to a set of CSI-RS resources provided in the mapping) used for one or more transmissions. A UE may use the DMRS pattern, the indication of the selected CSI-RS resource, and the mapping, to determine CSI-RS resources. In some instances, instead of or in addition to an explicit mapping from the base station, the UE may determine an implicit mapping between the DMRS pattern transmitted by the base station and the CSI-RS resources. In some instances, for example, the UE may determine, based on a grant, the DMRS pattern that is to be transmitted and may implicitly determine which configured CSI-RS resources cannot also be transmitted. In certain instances, the UE may receive the implicit mapping through other signaling. Accordingly, there may be an implicit association between the DMRS and CSI-RS resources.

In some other cases, the base station may transmit a CSI-RS resource configuration, and a mapping between DMRS patterns and CSI-RS resources to a UE. In such cases, one or more DMRS patterns may be precluded from DMRS transmissions based in part on the CSI-RS configuration. Thus, DMRS and CSI-RS transmissions may be configured semi-statically or dynamically by a base station. In some cases, one or more null DMRS patterns may be configured and mapped to one or more CSI-RS resources, and a base station may use a null DMRS pattern for one UE to transmit a DMRS to a different UE, and both UEs may measure channel state information based on an associated CSI-RS transmitted in mapped CSI-RS resources.

Aspects of the disclosure are initially described in the context of a wireless communications system. Various examples of DMRS patterns, CSI-RS resources, and mappings between DMRS patterns and CSI-RS resources are then described. Aspects of the disclosure are further illustrated by and described with reference to apparatus diagrams, system diagrams, and flowcharts that relate to joint determination of demodulation and channel state information reference signals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. UEs 115 and base stations 105 may transmit one or more reference signals, in which resources of one reference signal may be mapped to another reference signal to allow joint determination of resources for both reference signals.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality (e.g., based on measurements of one or more reference signals such as a CSI-RS), or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe (e.g., a slot TTI) or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot, or a mini-slot may be the smallest unit of scheduling. Each symbol may vary in duration depending on the subcarrier spacing or frequency band of operation, for example. Further, some wireless communications systems may implement slot aggregation in which multiple slots, or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.), and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

As indicated above, in some cases, a transmitter such as a base station 105, may transmit a DMRS that may be used by a receiver, such as a UE 115, for channel estimation and coherent demodulation of data transmissions from the transmitter. Also, as indicated above, in some cases wireless resources for DMRS transmissions may be variable or configurable, and various different DMRS patterns may be employed depending upon the type and configuration of transmissions. The variable DMRS patterns may also impact resources used for other transmissions, such as CSI-RS transmissions, and various techniques discussed herein provide for mapping one or more DMRS patterns to one or more available CSI-RS resources. A UE receiving DMRS and CSI-RS signals may thus determine CSI-RS resources, or reduce a search space for identification of CSI-RS transmissions, based on a DMRS pattern. In some other cases, the available DMRS patterns from a set of DMRS patterns may be constrained based in part on a CSI-RS configuration. For example, one or more DMRS patterns from the set of DMRS patterns may be precluded for DMRS transmissions based on CSI-RS configured at the base station. Thus, the UE may utilize an implicit mapping scheme where the UE may implicitly determine which configured CSI-RS resources or DMRS patterns cannot also be transmitted based on the DMRS pattern or CSI-RS configuration, respectively.

Figure 2:
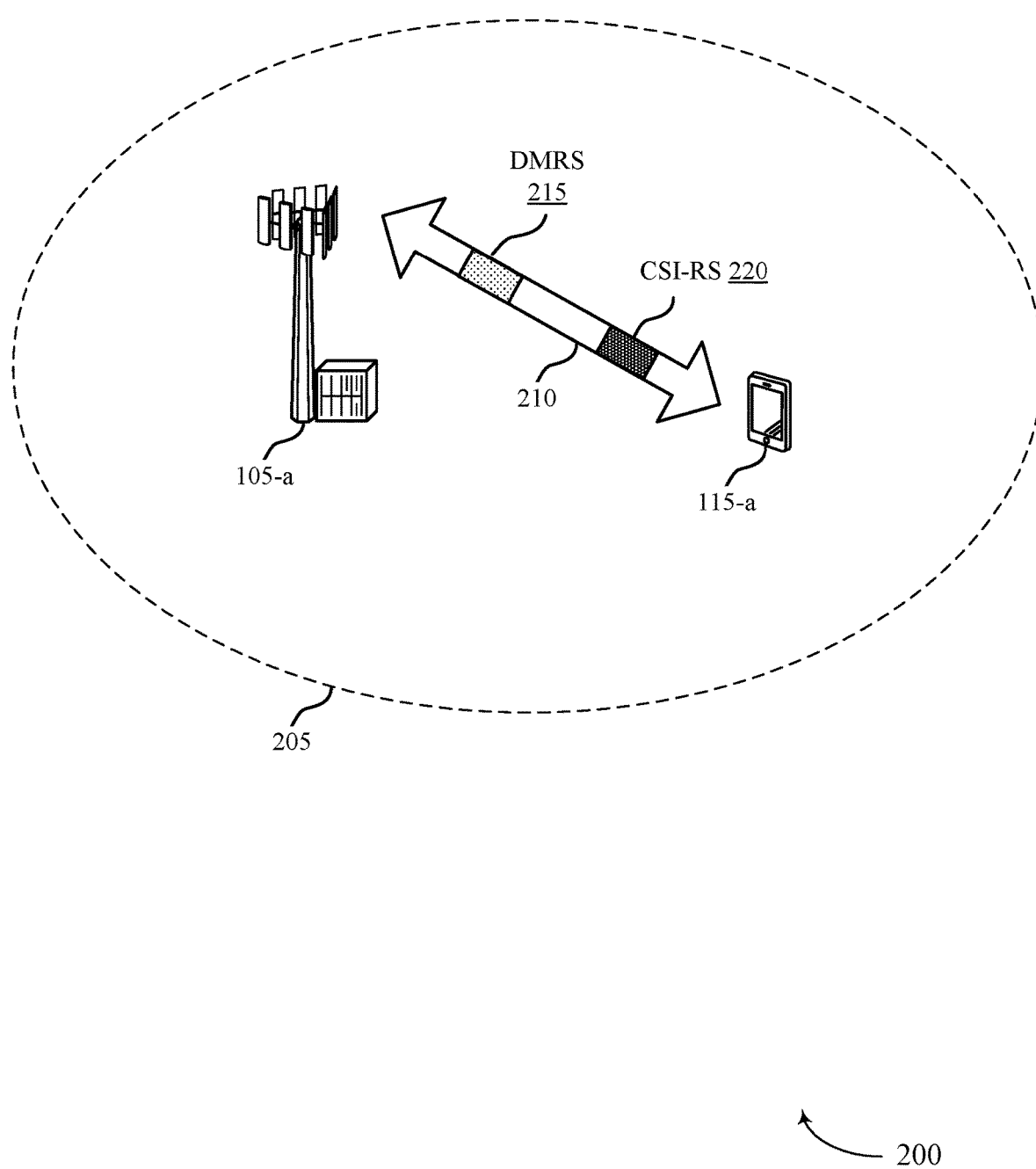
FIG. 2 illustrates an example of a wireless communication system that supports joint determination of demodulation and channel state information reference signals in accordance with aspects of the present disclosure.

FIG. 2 illustrates an example of a wireless communication system 200 that supports joint determination of demodulation and channel state information reference signals in accordance with various aspects of the present disclosure. In some examples, wireless communication system 200 may implement aspects of wireless communication system 100. Wireless communication system 200 may include a base station 105-a and a UE 115-a, which may be examples of the corresponding devices described with reference to FIG. 1.

In some examples, base station 105-a may be in communication with one or more UEs 115 within geographic coverage area 205. For example, base station 105-a may be in communication with UE 115-a via bidirectional communication link 210. Base station 105-a may transmit one or more reference signals, such as a DMRS 215 or a CSI-RS 220. In some cases, DMRS 215 may be transmitted using wireless resources at different locations within a transmission slot, and resources used for CSI-RS 220 may be modified based on the DMRS 215 resources. In some cases, for example, DMRS 215 may be transmitted in up to four OFDM symbols within a subframe, and a location of the DMRS 215 symbols may be different in different subframes. In some cases, CSI-RS 220 may not be multiplexed on any of the potential DMRS 215 OFDM symbol(s). However, in such cases, the locations of CSI-RS 220 may be relatively limited. In other cases, if DMRS 215 may be transmitted on a first number of symbols (e.g., up to four symbols), but is not transmitted on a subset of those symbols (e.g., DMRS is transmitted on only two symbols), CSI-RS 220 may be transmitted on the subset of the first number of symbols. In further cases, CSI-RS 220 may be multiplexed on all potential DMRS 215 OFDM symbol(s). As indicated above, various aspects of the present disclosure provide mappings between CSI-RS 220 resources and patterns of DMRS 215 transmissions. Thus, the CSI-RS 220 resources for a particular transmission or set of transmissions may be determined based on the DMRS 215 for that transmission or set of transmissions. In some cases, CSI-RS 220 resources may span 1, 2, or 4 OFDM symbols. If CSI-RS 220 resources span four OFDM symbols, for example, two pairs of adjacent OFDM symbols may be used for one CSI-RS 220 resource, where the two pairs can be adjacent or non-adjacent.

In some other cases, DMRS 215 may be constrained based on the configured CSI-RS 220. For instance, base station 105-a may transmit a mapping between CSI-RS 220 and DMRS 215, along with a CSI-RS configuration (i.e., potential CSI-RS 220 OFDM symbol(s)). In such cases, one or more DMRS patterns may be precluded for DMRS 215 transmissions.

FIGS. 3 through 6 illustrate several examples of potential DMRS patterns.

Figure 3:
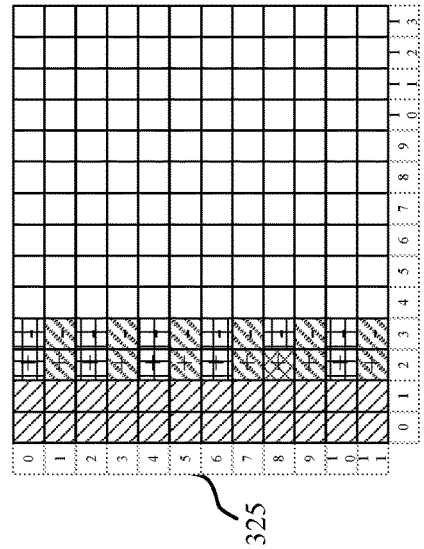
FIG. 3 illustrates examples of DMRS patterns that support joint determination of demodulation and channel state information reference signals in accordance with aspects of the present disclosure.
Figure 3:
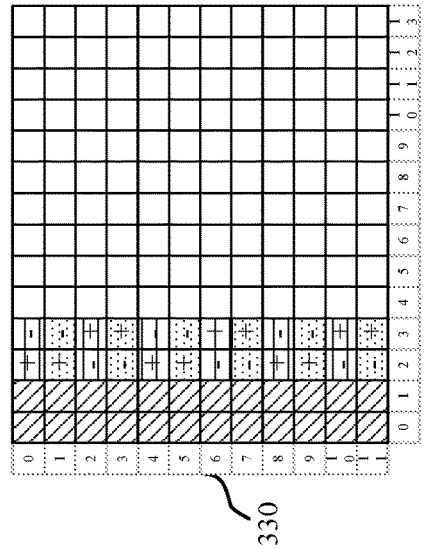
Figure 3:
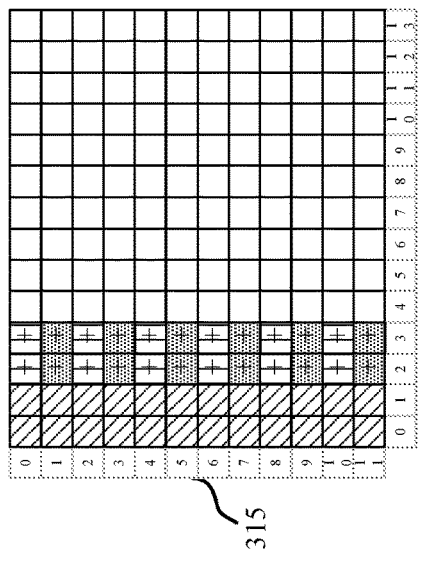
Figure 3:
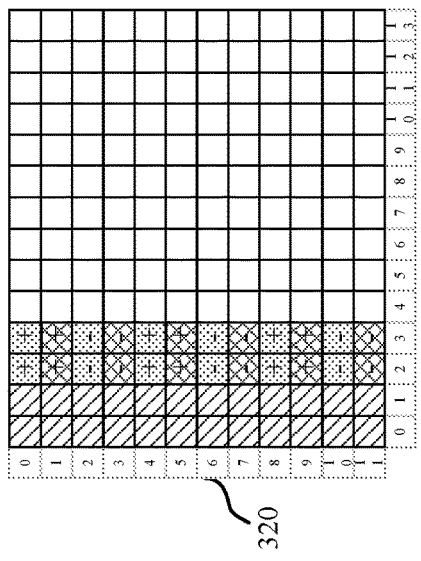
Figure 3:
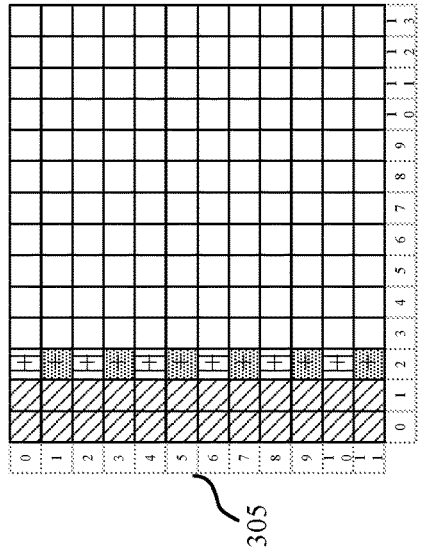
Figure 3:
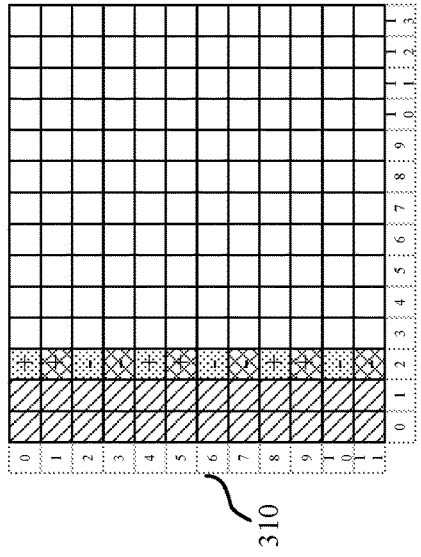

FIG. 3 illustrates examples of DMRS patterns 300 that support joint determination of demodulation and channel state information reference signals in accordance with various aspects of the present disclosure. In some examples, DMRS patterns 300 may implement aspects of wireless communication system 100 or 200. In this example, a UE (e.g., a UE 115 of FIG. 1 or FIG. 2), may be configured by higher layers with DMRS pattern either from a front-loaded DMRS Configuration type 1, or from a front-loaded DMRS Configuration type 2 for downlink and uplink transmissions. DMRS patterns 300 illustrate example configuration type 1 patterns. In some aspects, a DMRS pattern may refer to one or more resource elements used for DMRS transmissions, DMRS resource elements, which may be located in certain time-frequency locations within a frame, subframe, slot, or other time interval according to a configuration by the network or base station. Such DMRS patterns may repeat at regular intervals for a slot, subframe, frame, or a number of frames, or another time interval.

In the examples of FIG. 3, a first DMRS pattern 305 and a second DMRS pattern 310 are one-symbol DMRS patterns that are front loaded in a first slot of a subframe. The one-symbol patterns may be used for DMRS transmissions on up to four antenna ports, with the first DMRS pattern providing DMRS for antenna ports 0 and 1, and the second DMRS pattern providing DMRS for antenna ports 2 and 3. The one-symbol DMRS patterns may use a comb pattern with every other tone having a DMRS for a different antenna port.

DMRS patterns 300 may also include two-symbol DMRS patterns that include a third DMRS pattern 315, a fourth DMRS pattern 320, a fifth DMRS pattern 325, and a sixth DMRS pattern 330, in which DMRS for up to eight antenna ports may be provided. In the illustrated example DMRS patterns 315 through 330, a comb pattern may be used along with a time domain orthogonal cover code (TD-OCC) (e.g., {1 1} and {1 −1} for adjacent symbols), and may provide DMRS for up to 8 antenna ports. In other examples, DMRS patterns may be used that provide DMRS for up to four antenna ports without using both TD-OCC {1,1} and {1,−1}.

Figure 4:
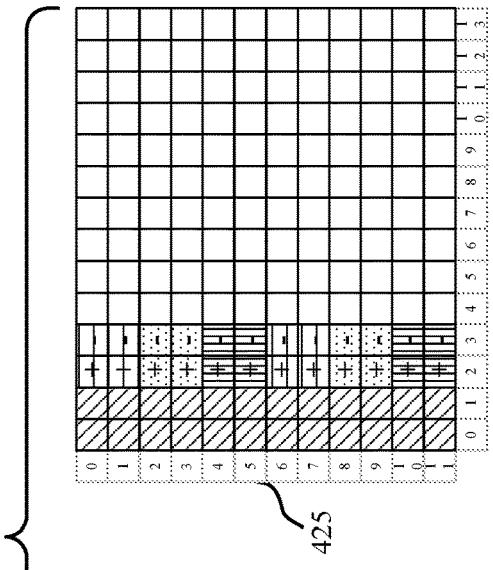
FIG. 4 illustrates other examples of DMRS patterns that support joint determination of demodulation and channel state information reference signals in accordance with aspects of the present disclosure.
Figure 4:
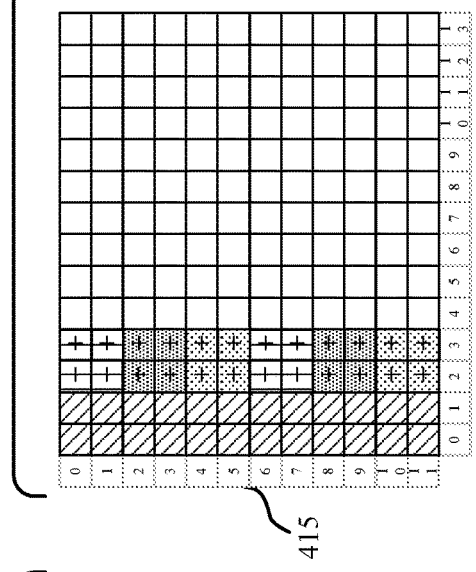
Figure 4:
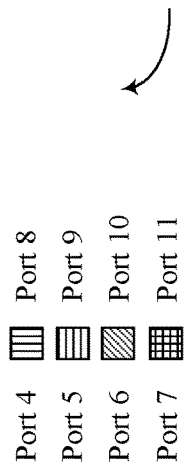
Figure 4:
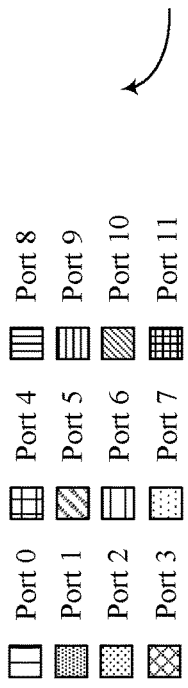
Figure 4:
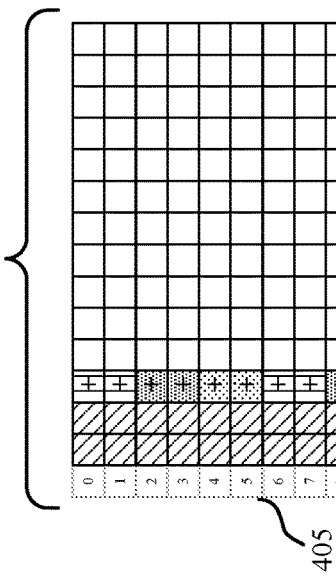
Figure 4:
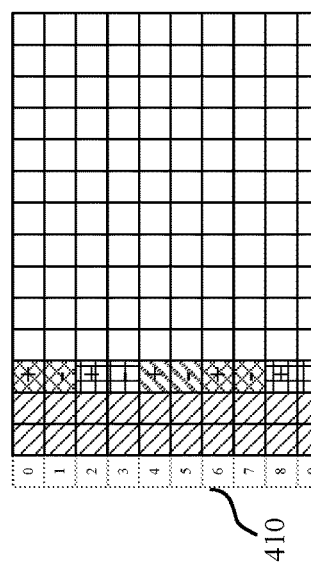

FIG. 4 illustrates examples of DMRS patterns 400 that support joint determination of demodulation and channel state information reference signals in accordance with various aspects of the present disclosure. In some examples, DMRS patterns 400 may implement aspects of wireless communication system 100 or 200. In this example, a UE (e.g., a UE 115 of FIG. 1 or FIG. 2), may again be configured from a front-loaded DMRS Configuration type 1 or from a front-loaded DMRS Configuration type 2 for downlink and uplink transmissions. DMRS patterns 400 illustrate example configuration type 2 patterns.

In the examples of FIG. 4, a first DMRS pattern 405 and a second DMRS pattern 410 are one-symbol DMRS patterns that are front loaded in a first slot of a subframe. The one-symbol patterns may be used for DMRS transmissions on up to six antenna ports, with the first DMRS pattern 405 providing DMRS for antenna ports 0, 1, and 2, and the second DMRS pattern 410 providing DMRS for antenna ports 3, 4, and 5. The one-symbol DMRS patterns may use a frequency division (FD) OCC (e.g., {1 1} and {1 −1}) for adjacent REs in the frequency domain, to provide DMRS for up to 6 antenna ports.

DMRS patterns 400 may also include two-symbol DMRS patterns that include a third DMRS pattern 415, a fourth DMRS pattern 420, a fifth DMRS pattern 425, and a sixth DMRS pattern 430, in which DMRS for up to 12 antenna ports may be provided. In the illustrated example DMRS patterns 415 through 430, FD-OCC may be applied across adjacent REs in the frequency domain, and TD-OCC (e.g., {1,1} and {1,−1}) applied across adjacent REs in the time domain. The DMRS signal sequence design for downlink and uplink CP-OFDM is a known QPSK sequence that is transmitted by each port in the corresponding resource elements.

Figure 5:
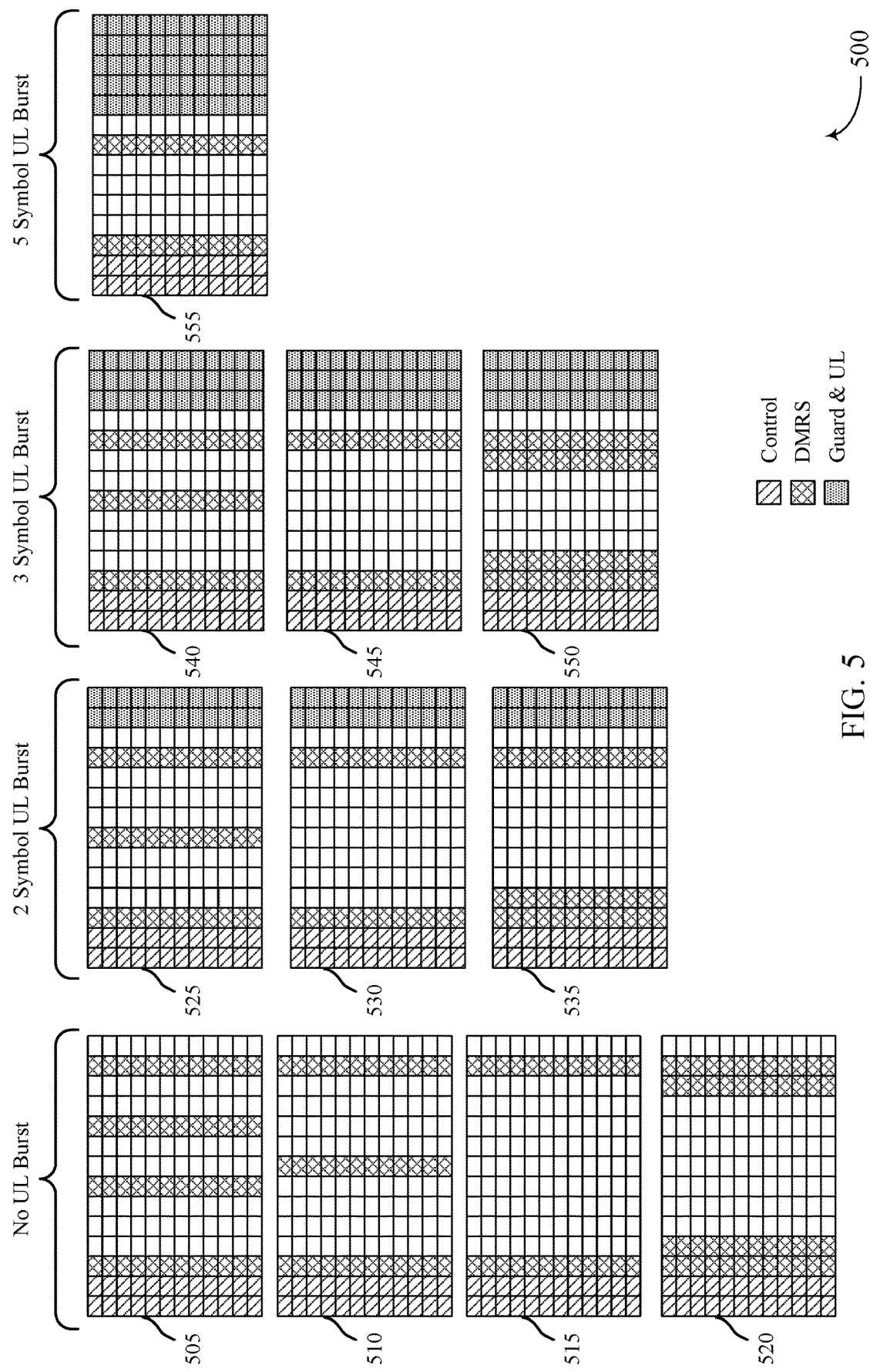
FIG. 5 illustrates examples of different resource configurations that support joint determination of demodulation and channel state information reference signals in accordance with aspects of the present disclosure.

FIG. 5 illustrates further examples of DMRS patterns 500 that support joint determination of demodulation and channel state information reference signals in accordance with various aspects of the present disclosure. In some examples, DMRS patterns 500 may implement aspects of wireless communication system 100 or 200. In this example, some subframes may include both a downlink portion and an uplink burst portion, and some subframes may include only downlink transmissions. Depending upon which symbols are configured for downlink or uplink transmissions, other symbols may be configured for DMRS to provide enhanced DMRS for each subframe.

In the examples of FIG. 5, a number of DMRS patterns may be used for subframes with no uplink burst portions, including first DMRS pattern 505 with four spaced DMRS symbols, a second DMRS pattern 510 with three spaced DMRS symbols, a third DMRS pattern 515 with two spaced DMRS symbols, and a fourth DMRS pattern 520 with four DMRS symbols that are located in pairs of symbols, with different pairs spread across the subframe. In cases where a two-symbol uplink burst is present, a fifth DMRS pattern 525 may include three spaced DMRS symbols, a sixth DMRS pattern 530 with two spaced DMRS symbols, and a seventh DMRS pattern 535 with two front-loaded DMRS symbols and a third spaced DMRS symbol.

In cases where a three-symbol uplink burst is present, an eighth DMRS pattern 540 may include three spaces DMRS symbols, a ninth DMRS pattern 545 may include two spaced DMRS symbols, and a tenth DMRS pattern 550 may include four DMRS symbols arranged as pairs of adjacent DMRS symbols with different pairs spread across the downlink symbols. In cases where a five-symbol uplink burst is present, an eleventh DMRS pattern 555 may have two spaced DMRS symbols spread across the downlink symbols.

Figure 6:
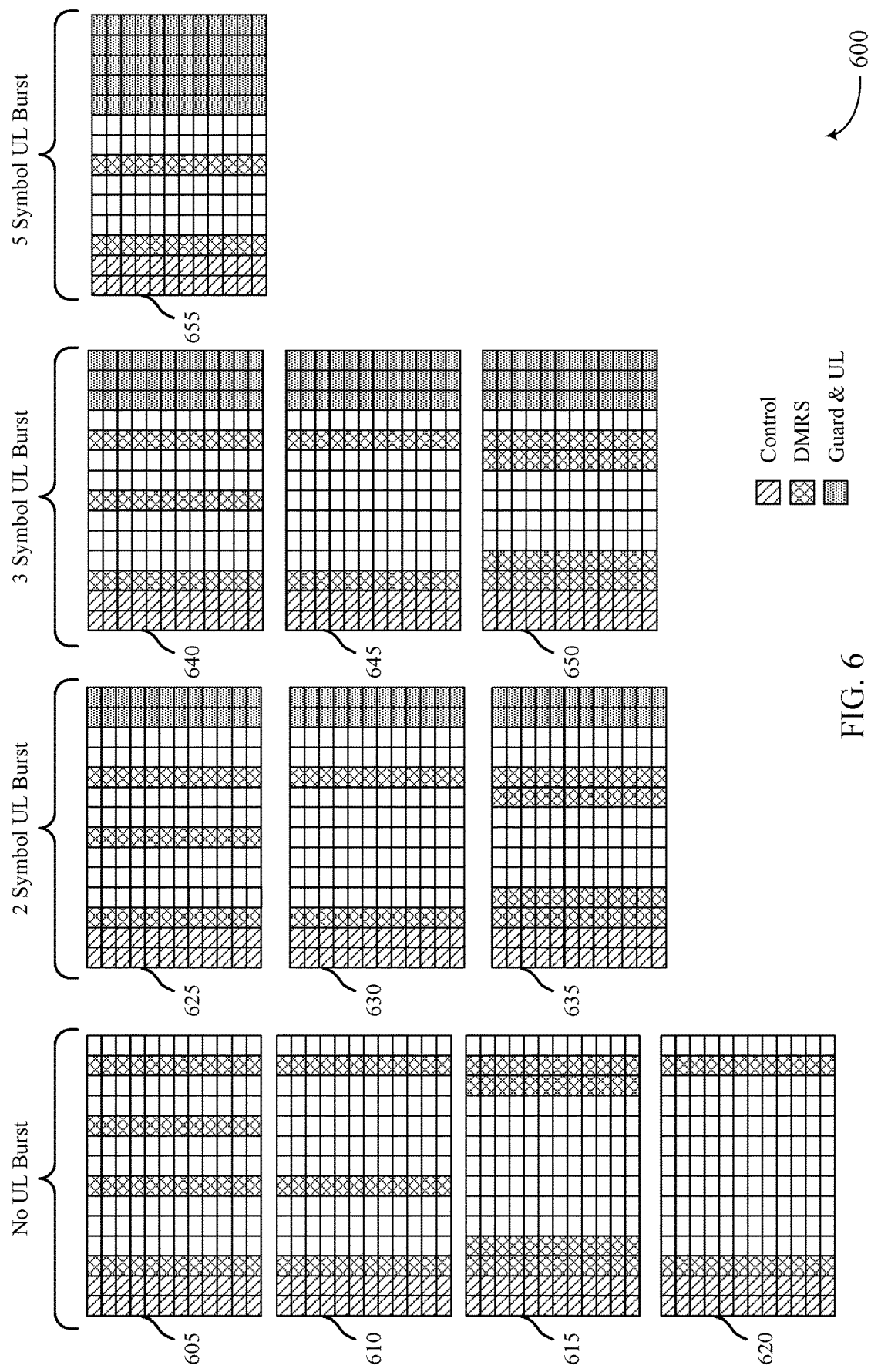
FIG. 6 illustrates further examples of resource configurations that support joint determination of demodulation and channel state information reference signals in accordance with aspects of the present disclosure.

FIG. 6 illustrates further examples of DMRS patterns 600 that support joint determination of demodulation and channel state information reference signals in accordance with various aspects of the present disclosure. In some examples, DMRS patterns 600 may implement aspects of wireless communication system 100 or 200. In this example again, some subframes may include both a downlink portion and an uplink burst portion, and some subframes may include only downlink transmissions. Depending upon which symbols are configured for downlink or uplink transmissions, other symbols may be configured for DMRS to provide enhanced DMRS for each subframe. In the examples of FIG. 6, DMRS symbols may be located at the same symbols within a subframe irrespective of a number of uplink symbols, with uplink symbols replacing DMRS symbols in the event that the DMRS symbol is located in the uplink burst.

In the examples of FIG. 6, a number of DMRS patterns may be used for subframes with no uplink burst portions, including first DMRS pattern 605 with four spaced DMRS symbols, a second DMRS pattern 610 with three spaced DMRS symbols, a third DMRS pattern 615 with four DMRS symbols that are located in pairs of symbols with different pairs spread across the subframe, and a fourth DMRS pattern 620 with two spaced DMRS symbols. In cases where a two-symbol uplink burst is present, a fifth DMRS pattern 625 may include three spaced DMRS symbols, a sixth DMRS pattern 630 with two spaced DMRS symbols, and a seventh DMRS pattern 635 with two front-loaded DMRS symbols and a third spaced DMRS symbol.

In cases where a three-symbol uplink burst is present, an eighth DMRS pattern 640 may include three spaced DMRS symbols, a ninth DMRS pattern 645 may include two spaced DMRS symbols, and a tenth DMRS pattern 650 may include four DMRS symbols arranged as pairs of adjacent DMRS symbols with different pairs spread across the downlink symbols. In cases where a five-symbol uplink burst is present, an eleventh DMRS pattern 655 may have two spaced DMRS symbols spread across the downlink symbols.

As indicated above, various techniques discussed herein provide for mapping one or more DMRS patterns to one or more available CSI-RS resources. In some cases, a base station may transmit DMRS patterns and a mapping between DMRS patterns and CSI-RS resources to a UE, and subsequently transmit (e.g., in downlink control information (DCI) or radio resource control (RRC) signaling) an indication of a DMRS pattern and an indication of a selected CSI-RS resource (e.g., an indication of the CSI-RS resource or an index to a set of CSI-RS resources provided in the mapping) used for one or more transmissions. A UE may use the DMRS pattern, the indication of the selected CSI-RS resource, and the mapping, to determine CSI-RS resources. In some other cases, the base station may transmit a CSI-RS configuration, and a mapping between DMRS patterns and CSI-RS resources to a UE. In some aspects, the mapping may be used to indicate that one or more DMRS patterns may be precluded for DMRS transmissions, based on the CSI-RS configuration. Thus, the UE may use the CSI-RS configuration, and the mapping to determine DMRS resources.

In some other cases, the UE may determine an implicit mapping between the DMRS pattern and CSI-RS resources, based on the DMRS pattern transmitted by the base station. For instance, the UE may determine, based on a grant, the DMRS pattern that is to be transmitted and may implicitly determine which configured CSI-RS resources may not be used for transmission of CSI-RS. In other cases, the UE may deduce the implicit mapping based on signaling other than a grant.

In some examples, and as further illustrated in FIG. 6, resources selected for CSI-RS and DMRS transmissions may not overlap based on the mapping between CSI-RS resources and DMRS patterns. For instance, in some cases, DMRS patterns and CSI-RS resources may overlap by configuration, but the mapping may allow non-overlapping resources to be used during scheduling. Thus, in some aspects, one or more DMRS patterns, or CSI-RS resources may be precluded for RS transmissions based on the DCI and mapping (e.g., implicit or explicit).

Figure 7:
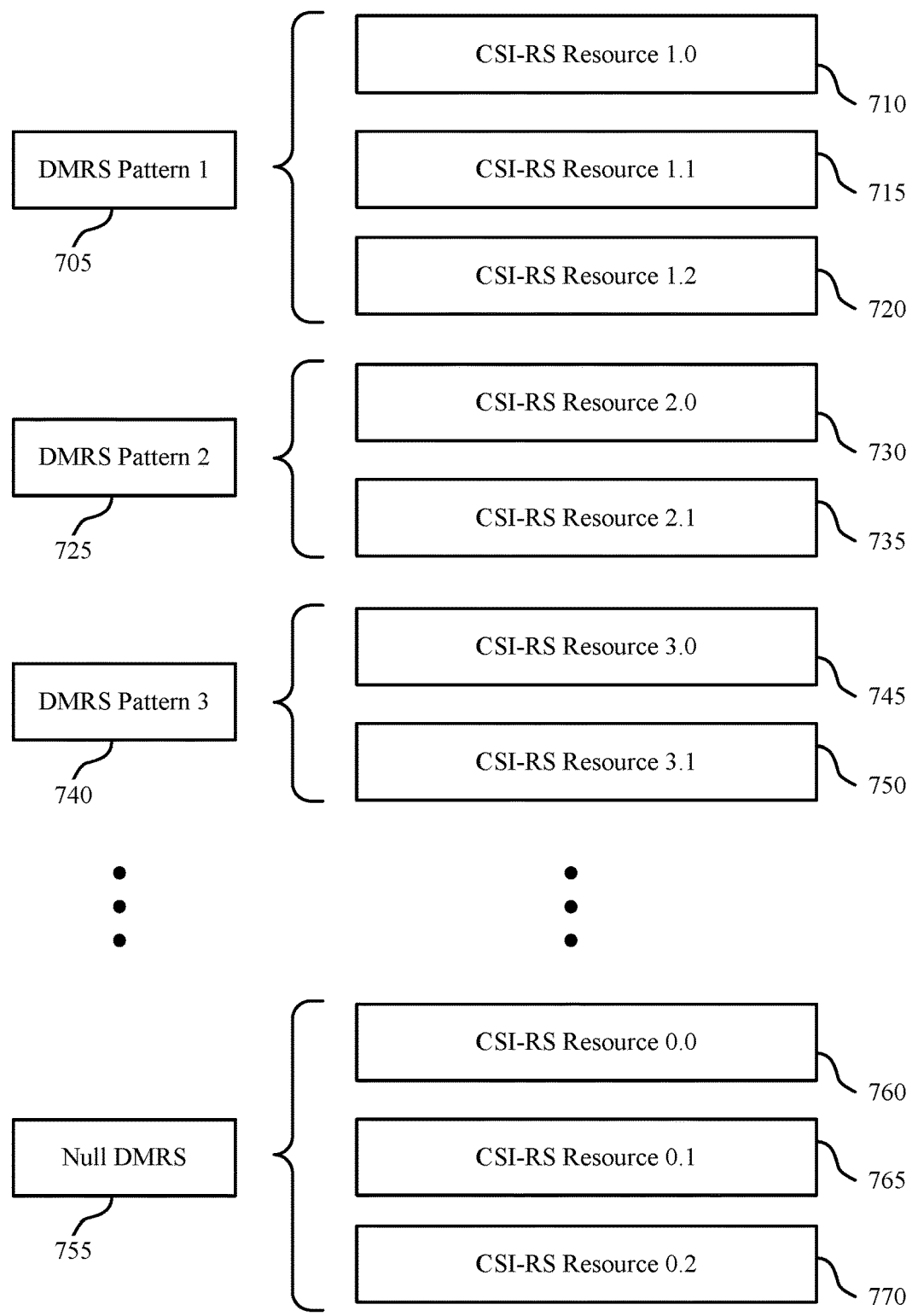
FIG. 7 illustrates an example of a mapping that supports joint determination of demodulation and channel state information reference signals in accordance with aspects of the present disclosure.

FIG. 7 illustrates an example of a mapping 700 that supports joint determination of demodulation and channel state information reference signals in accordance with various aspects of the present disclosure. In some examples, mapping 700 may implement aspects of wireless communication system 100 or 200. In this example, a base station (e.g. a base station 105 of FIG. 1 or 2) may semi-statically signal (e.g., through RRC signaling) a UE (e.g., a UE 115 of FIG. 1 or 2) a subset of possible DMRS patterns/configurations that are likely to be used for that specific UE. In this example, the base station may signal that DMRS pattern 1 705, DMRS pattern 2 725, DMRS pattern 3 740, or a null DMRS pattern 755, will be used for transmissions with the UE. Other DMRS patterns may also be indicated, and the example of FIG. 7 is provided for illustration and discussion purposes with the understanding that more of fewer DMRS patterns may be configured at the UE.

The base station may also signal, such as through semi-static signaling (e.g., RRC signaling) the possible CSI-RS resources that may be configured to the UE. In this example, for DMRS pattern 1 705, three different CSI-RS resources may be configured to the UE, including CSI-RS resource 1.0 710, CSI-RS resource 1.1 715, and CSI-RS resource 1.2 720. For DMRS pattern 2 725, two different CSI-RS resources may be configured to the UE, including CSI-RS resource 2.0

730, and CSI-RS resource 2.1 735. For DMRS pattern 3 740, two different CSI-RS resources may be configured to the UE, including CSI-RS resource 3.0 745, and CSI-RS resource 3.1 750. Similarly, for null DMRS pattern 755, three different CSI-RS resources may be configured to the UE, including CSI-RS resource 0.0 760, CSI-RS resource 0.1 765, and CSI-RS resource 0.2 770.

Such a mapping 700 CSI-RS resources and DMRS configurations provides that, when a specific DMRS configuration is enabled, only a subset of the available CSI-RS resources may be enabled. In some cases, the DMRS pattern and CSI-RS resources may be indicated in DCI provided to a UE for a particular transmission or set of transmissions. For example, a base station may transmit a first set of bits that indicate which DMRS pattern is used, which may be indexed to a DMRS pattern from the mapping 700, along with a second set of bits that indicate the particular CSI-RS resource for the transmission, which may be indexed to the particular CSI-RS resources associated with the signaled DMRS pattern. In some examples, when no DMRS is transmitted to a UE in a slot, CSI-RS may still be transmitted in that slot, and the null DMRS pattern 755 may be indicated along with an indication of which of the CSI-RS resource 0.0 760, CSI-RS resource 0.1 765, or CSI-RS resource 0.2 770 is used for CSI-RS transmission. In some cases, there may be multiple "Null DMRS" options configured to a UE, so that the base station has the flexibility to change the DMRS pattern of the other UEs. The "Null DMRS" option may correspond to a specified/reference DMRS, such as a front-load DMRS configuration, a specified/reference DMRS that may be cell-specifically configured to all the UEs, or combinations thereof. In some cases, one or more zero power (ZP) CSI-RS resources may be configured to the UE that may not need to depend on the DMRS configuration, and may be configured independently of non-zero-power CSI-RS resources.

As indicated above, in some cases the base station may signal possible CSI-RS resources that may be configured to a UE. For each CSI-RS resource, depending on the DMRS configurations, some parameters may change of that specific CSI-RS resource. For example, the same CSI-RS resource may have more than one set of parameters that define it, depending on the DMRS configuration. Such parameters may include, for example, CSI-RS location (symbols, tones, REs, etc.), CDM options for the configured ports due to the CSI-RS location change, CSI-RS transmission size, or combinations thereof. For example, a CSI-RS resource may have four symbols and 32 ports. If the configured DMRS is a first DMRS pattern, then CSI-RS is transmitted in four consecutive symbols, otherwise if the configured DMRS is a second DMRS pattern, CSI-RS is transmitted in two groups of two adjacent symbols.

Figure 8:
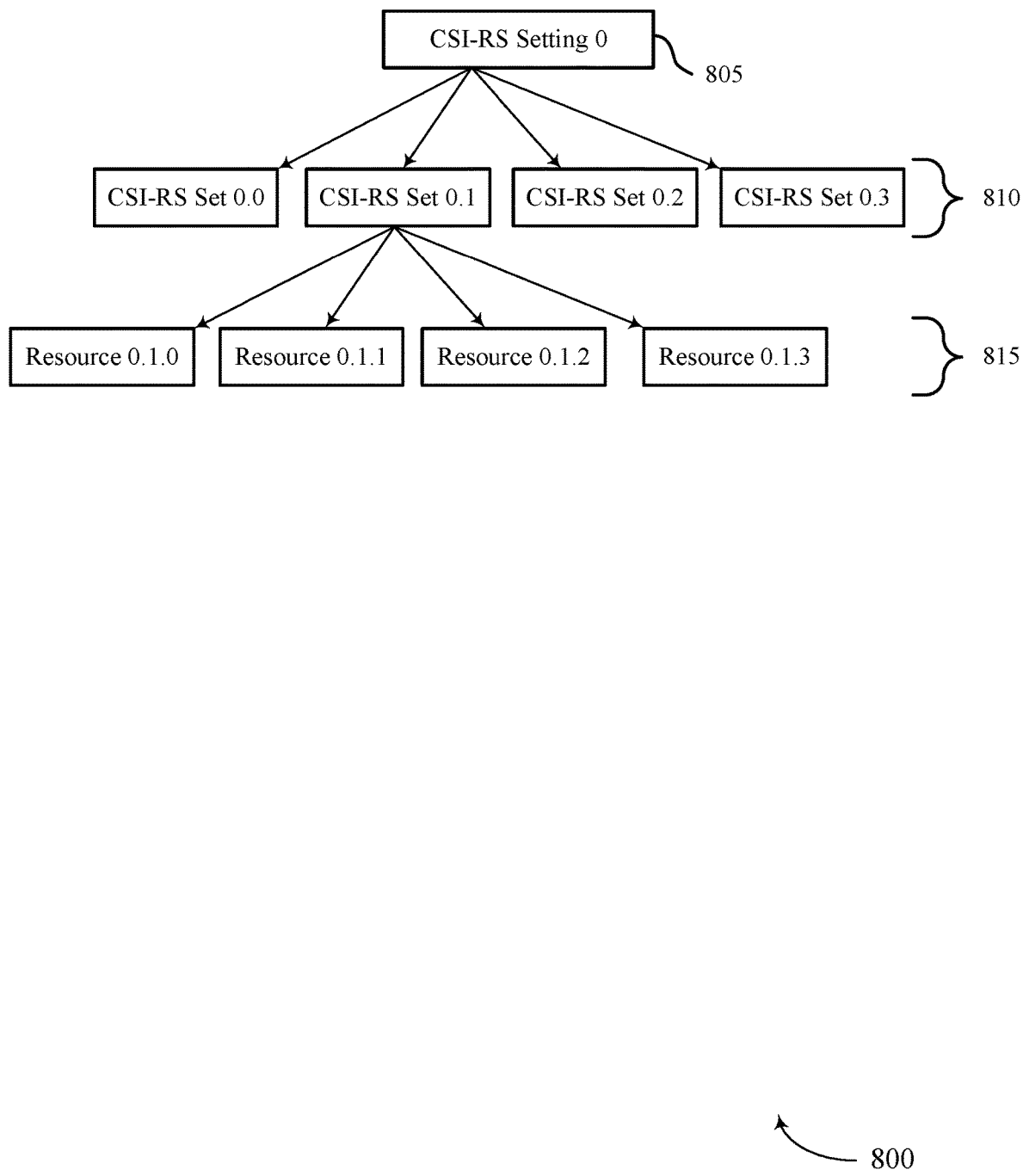
FIG. 8 illustrates an example of CSI-RS settings, resource sets, and associated resources that support joint determination of demodulation and channel state information reference signals in accordance with aspects of the present disclosure.

FIG. 8 illustrates an example of CSI-RS settings, resource sets, and associated resources of a mapping 800 that support joint determination of demodulation and channel state information reference signals in accordance with various aspects of the present disclosure. In some examples, mapping 800 may implement aspects of wireless communication system 100 or 200.

In the example of FIG. 8, a CSI-RS setting 805 may have a number of CSI-RS sets 810 associated therewith, and each CSI-RS set 810 may have a number of CSI-RS resources 815 associated therewith. In such examples, depending on the DMRS configuration, a different CSI-RS set 810 is enabled, and the CSI-RS resources 815 may be enabled based on the CSI-RS set 810. In some cases, the CSI-RS set 810 may be indicated with a first set of bits and the CSI-RS resources may be indicated with a second set of bits.

Furthermore, a configured CSI-RS resource (or equivalently the parameters of a CSI-RS resource) may change for different front-load DMRS configuration (e.g., config-1 or config-2 as discussed above with respect to FIGS. 3-4). For example, DMRS configuration 1 uses a comb-2 solution, whereas DMRS configuration 2 uses a 2-by-2 boxes (FD-OCC and TD-OCC). So, if CSI-RS and DMRS appear on the same symbol, (either NZP or ZP CSIRS), then the CSI-RS pattern may need to change accordingly.

In some other cases, DMRS pattern may change based in part on the CSI-RS and DMRS appearing on the same symbol. For instance, a mapping (either implicit or explicit) between CSI-RS resources and DMRS patterns provides that, when a specific CSI-RS configuration is enabled, only a subset of the available DMRS patterns may be enabled.

Figure 9:
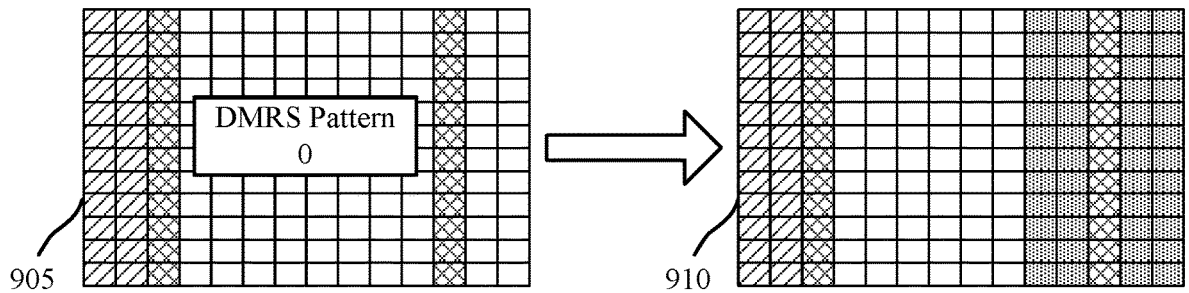
FIG. 9 illustrates an example of DMRS and CSI-RS resources in accordance with aspects of the present disclosure.
Figure 9:
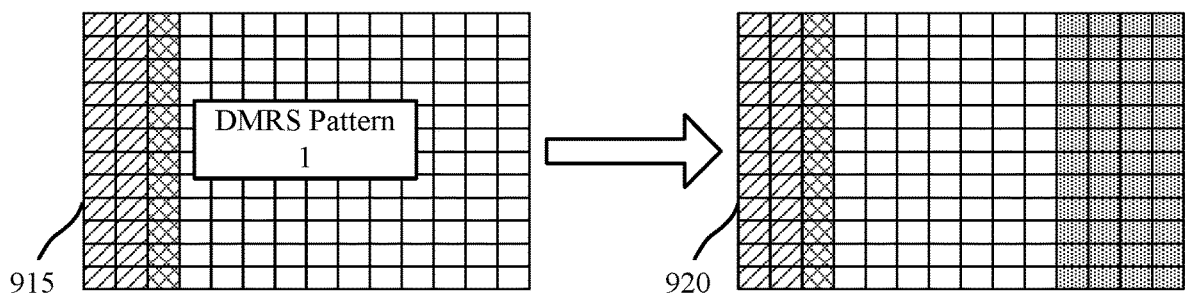

FIG. 9 illustrates an example of DMRS and CSI-RS resources 900 that supports joint determination of demodulation and channel state information reference signals in accordance with various aspects of the present disclosure. In some examples, DMRS and CSI-RS resources 900 may implement aspects of wireless communication system 100 or 200. In this example, a UE may be configured with DMRS pattern 0 905 that includes two spaced DMRS symbols. In this case, CSI-RS resources may be configured to span four OFDM symbols, and may be located around the DMRS symbols, according to pattern 910. Similarly, DMRS pattern 1 915 may have one front-loaded DMRS symbol, and the corresponding DMRS and CSI-RS pattern 920 may have four adjacent OFDM symbols configured for CSI-RS.

Figure 10:
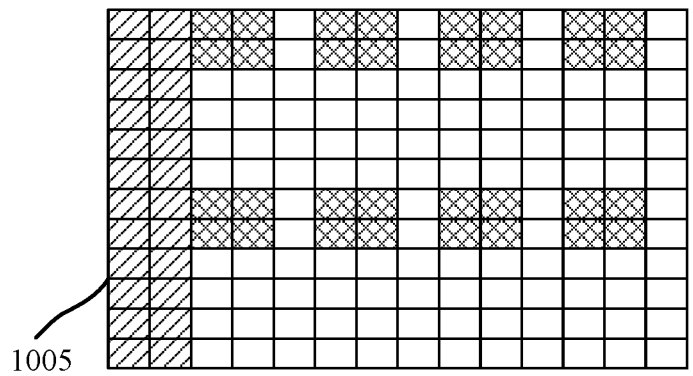
FIG. 10 illustrates examples of DMRS and CSI-RS resources with and without frequency domain staggering that support joint determination of demodulation and channel state information reference signals in accordance with aspects of the present disclosure.
Figure 10:
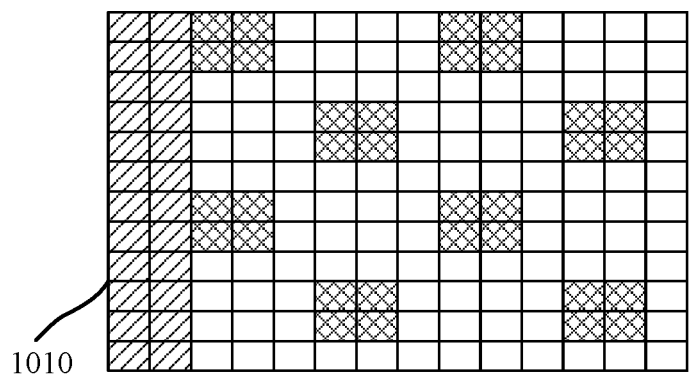

FIG. 10 illustrates an example of a DMRS and CSI-RS resources 1000 that supports joint determination of demodulation and channel state information reference signals in accordance with various aspects of the present disclosure. In some examples, DMRS and CSI-RS resources 1000 may implement aspects of wireless communication system 100 or 200. In this example, a first DMRS pattern 1005 may have DMRS resources that use the same tones in different OFDM symbols. A second DMRS pattern 1010 may have DMRS resources that are frequency staggered across OFDM symbols. In such cases, CSI-RS resources may be associated with the different DMRS patterns. Thus, the CSI-RS parameter in such a case would be changed when the DMRS configuration changes from the non-staggered to the staggered configuration.

Figure 11:
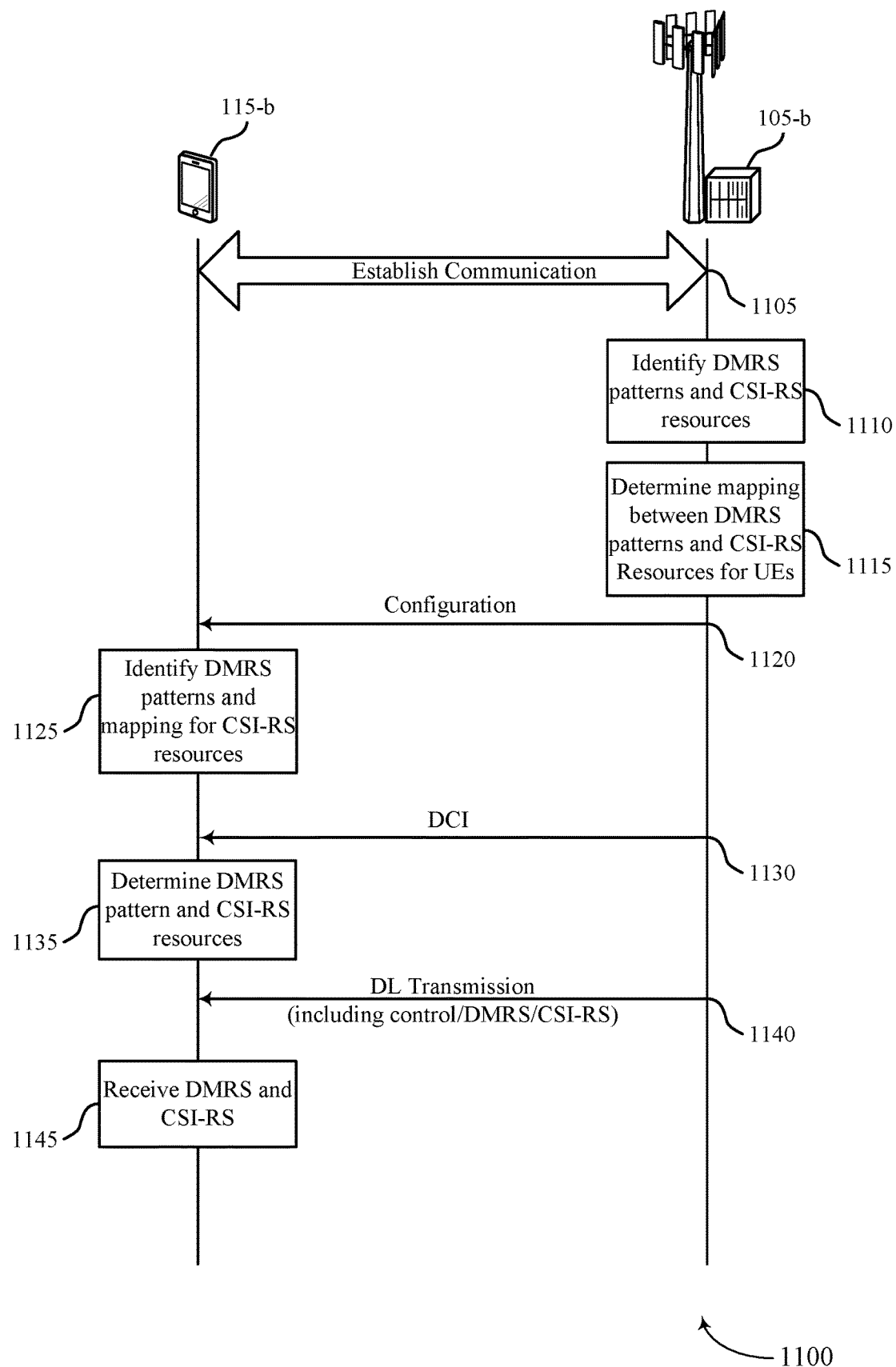
FIG. 11 illustrates an example of a process flow that supports joint determination of demodulation and channel state information reference signals in accordance with aspects of the present disclosure.

FIG. 11 illustrates an example of a process flow 1100 that supports joint determination of demodulation and channel state information reference signals in accordance with various aspects of the present disclosure. In some examples, process flow 1100 may implement aspects of wireless communication system 100. Process flow 1100 may include a base station 105-*b*, and a UE 115-*b*, which may be examples of the corresponding devices described with reference to FIG. 1-2. The base station 105-*b* and the UE 115-*b* may establish a connection 1105 according to established connection establishment techniques for the wireless communications system.

At 1110, the base station 105-*b* may identify DMRS patterns and a set of available CSI-RS resources that may be used for reference signal transmissions. The DMRS patterns may be identified, for example, as one or more available DMRS patterns that may be configured at the UE 115-*b*. The DMRS patterns may be, for example, different patterns of OFDM symbols that may include DMRS transmissions, a number of adjacent REs that may be used for DMRS for a particular antenna port, an OCC applied to adjacent REs, or any combination thereof. In some examples, the base station 105-*b* may identify potential DMRS patterns for the UE 115-*b* based at least in part on one or more services that may be enabled at the UE 115-*b* (e.g., a ultra-reliable low latency (URLLC) or enhanced mobile broadband (eMBB) service) and configurations for uplink and downlink transmissions associated therewith (e.g., transmissions using slot TTIs or 1 ms TTIs). CSI-RS resources may be identified based on, for example, a number of symbols that may be available for CSI-RS transmissions, multiplexing available for multiplexing CSI-RS and DMRS transmissions, frequency staggering of DMRS transmissions across symbols, or any combination thereof.

At 1115, the base station 105-*b* may determine a mapping between the DMRS patterns and CSI-RS resources for UEs. In some cases, the base station may identify a first number of potential DMRS patterns for the UE 115-*b*, and may then identify a second number of potential CSI-RS resources associated with each DMRS pattern. The base station 105-*b* may map the potential CSI-RS resources to the corresponding potential DMRS pattern, and provide the mapping to the UE 115-*b* through a configuration 1120 transmission. In some cases, the configuration 1120 may be transmitted using RRC signaling, and the potential DMRS patterns and associated CSI-RS resources may be semi-statically configured at the UE 115-*b*.

At 1125, the UE 115-*b* may identify the DMRS patterns and the mapping for the CSI-RS resources. The UE 115-*b* may identify the DMRS patterns and the mapping based on the configuration 1120 transmission. In some cases, the base station 105-*b* may explicitly indicate each enabled DMRS pattern and each of a number of associated CSI-RS resources for each DMRS pattern. In other cases, the UE 115-*b* may be configured with a superset of available DMRS patterns and available CSI-RS resources, and the configuration 1120 may indicate that one or more subsets of DMRS patterns, and one or more subsets of CSI-RS resources that are associated with each DMRS pattern are enabled. In some other cases, the UE 115-*b* may be configured with a CSI-RS resource configuration, and the configuration 1120 may indicate one or more subsets of CSI-RS resources that are enabled.

The base station 105-*b* may allocate resources for a transmission, and transmit DCI 1130 to the UE 115-*b* that contains an indication of the allocated resources. The DCI 1130 may also include information for which DMRS pattern of the enabled DMRS patterns is to be used for the transmission, and which CSI-RS resource associated with the selected DMRS pattern is to be used for the transmission. In some other cases, the DCI 1130 may provide an indication of only one of the CSI-RS resource or DMRS pattern. In such cases, the UE may use an implicit scheme for determining the other one of the DMRS pattern or the CSI-RS resource, respectively.

The UE 115-*b*, at 1135, may determine the DMRS pattern and the CSI-RS resources based at least in part on the information from the DCI, the enabled DMRS patterns, and the mapping between the DMRS patterns and CSI-RS resources. In some examples, DMRS patterns may be constrained for transmissions based on the configured CSI-RS resource configuration. For instance, the mapping between DMRS patterns and CSI-RS resources may be used to determine one or more DMRS patterns that are precluded, which may allow non-overlapping resources to be used for DMRS and CSI-RS transmissions. In such cases, the UE may determine an implicit mapping between the DMRS pattern and the CSI-RS resources, based on an indication of one of the DMRS pattern or the CSI-RS resources. In some instances, the UE 115-*b* may determine, based on the DCI 1130, the selected CSI-RS resources, and may implicitly determine which DMRS patterns may not be used for transmission of DMRS. Accordingly, there may be an implicit association between the DMRS and CSI-RS resources.

In cases where different subsets of CSI-RS resources are associated with a DMRS pattern, the DCI may include an indication of the selected DMRS pattern (e.g., a first index into a list of enabled DMRS patterns) and an indication of the selected CSI-RS resources (e.g., a second index into a list of CSI-RS resources associated with the DMRS pattern).

The base station 105-*b* may then transmit a downlink transmission 1140 (e.g., a PDSCH transmission) having associated control, DMRS, and CSI-RS transmissions. At block 1145, the UE 115-*b* may then receive the DMRS and CSI-RS according to the DMRS pattern and CSI-RS resources that were used for the downlink transmission 1140. The UE 115-*b* may use the DMRS for channel estimation and coherent demodulation of data transmitted in the downlink transmission 1140. The UE 115-*b* may also perform measurements of the CSI-RS transmissions and may provide such measurements to the base station 105-*b* as part of channel state information that may be transmitted to the base station.

Figure 12:
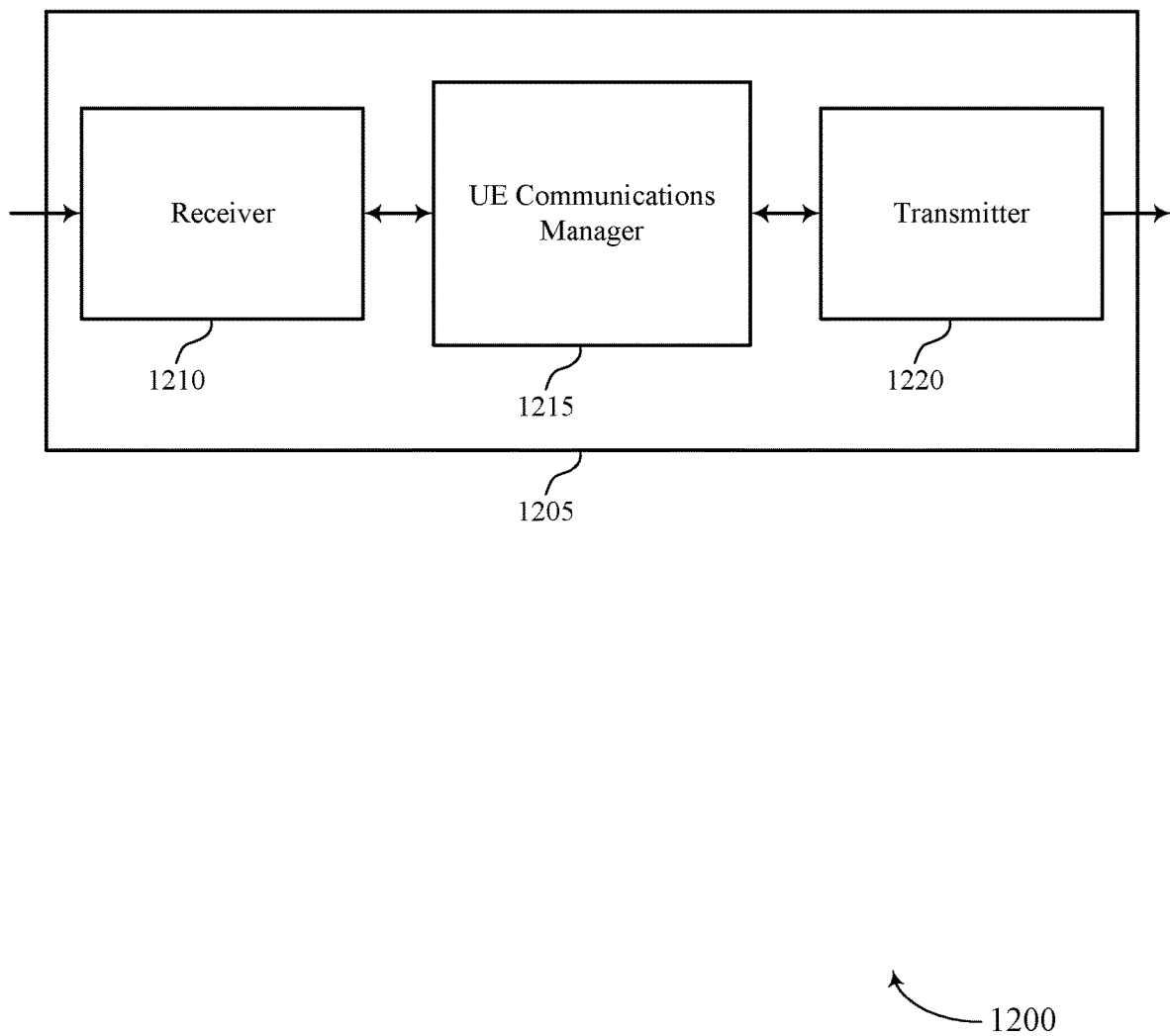
FIGS. 12 through 14 show block diagrams of a device that supports joint determination of demodulation and channel state information reference signals in accordance with aspects of the present disclosure.

FIG. 12 shows a block diagram 1200 of a wireless device 1205 that supports joint determination of demodulation and channel state information reference signals in accordance with aspects of the present disclosure. Wireless device 1205 may be an example of aspects of a UE 115 as described herein. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to joint determination of demodulation and channel state information reference signals, etc.). Information may be passed on to other components of the device. The receiver 1210 may be an example of aspects of the transceiver 1535 described with reference to FIG. 15. The receiver 1210 may utilize a single antenna or a set of antennas.

UE communications manager 1215 may be an example of aspects of the UE communications manager 1515 described with reference to FIG. 15.

UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof, designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may identify a set of DMRS patterns for use at a UE and a set of available CSI-RS resources, receive downlink control information (DCI) indicating one or more of the DMRS patterns based at least in part on a mapping between one or more of the set of DMRS patterns and one or more of the set of available CSI-RS resources that are associated with the one or more DMRS patterns, and receive one or more of a DMRS or a CSI-RS based at least in part on the received DCI and the mapping.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
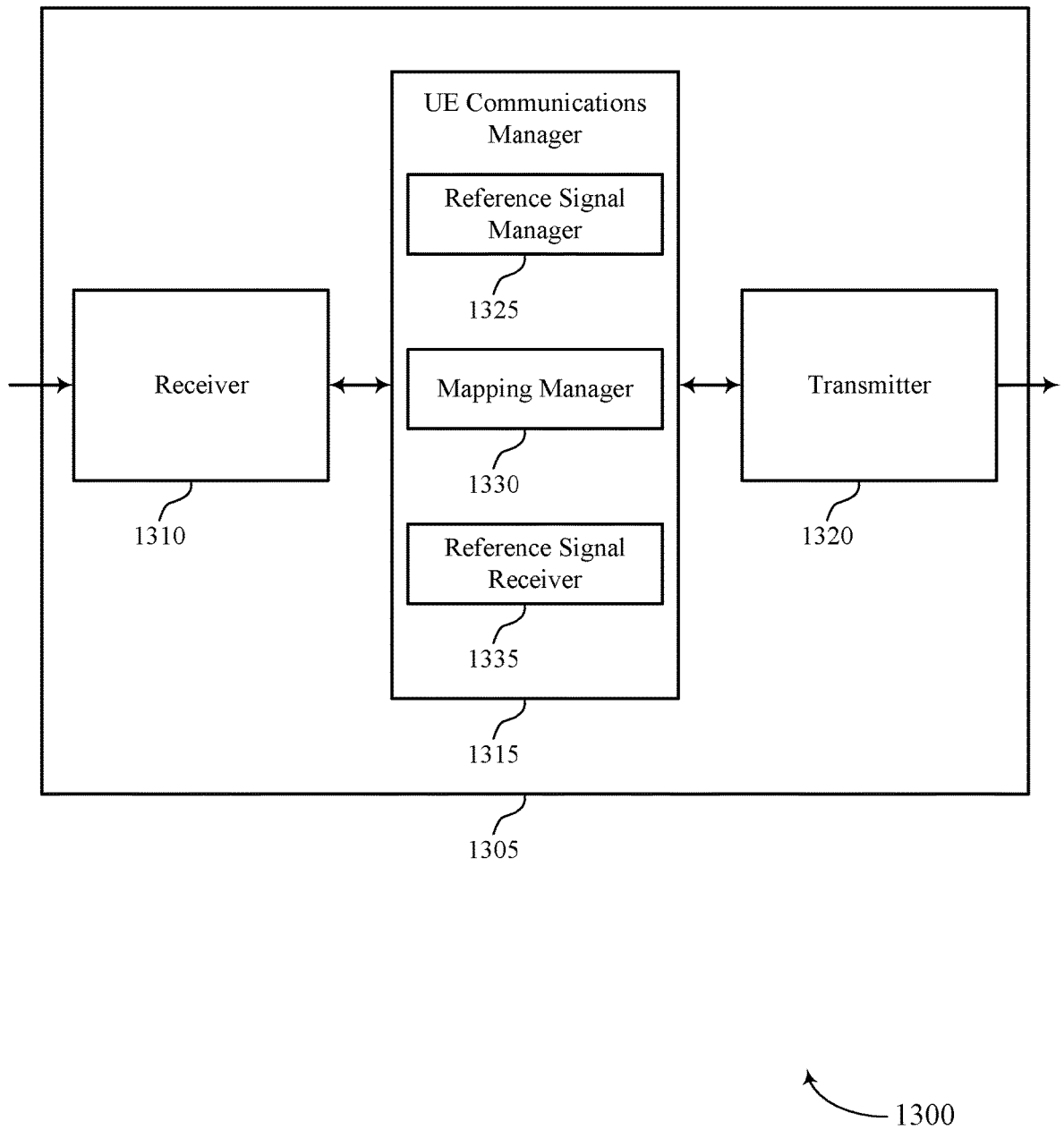

FIG. 13 shows a block diagram 1300 of a wireless device 1305 that supports joint determination of demodulation and channel state information reference signals in accordance with aspects of the present disclosure. Wireless device 1305 may be an example of aspects of a wireless device 1205 or a UE 115 as described with reference to FIG. 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to joint determination of demodulation and channel state information reference signals, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15. UE communications manager 1315 may also include reference signal manager 1325, mapping manager 1330, and reference signal receiver 1335.

Reference signal manager 1325 may identify a set of DMRS patterns for use at a UE and a set of available CSI-RS resources. Reference signal manager 1325 may also receive an indication of a first DMRS pattern for a first downlink transmission, and receive an indication of one or more ZP CSI-RS resources that are configured independently of the DMRS patterns. In some cases, the set of DMRS patterns includes a null DMRS pattern mapped to one or more CSI-RS resources. In some cases, the set of null DMRS patterns are received in a cell-specific configuration of all UEs within a cell.

Mapping manager 1330 may receive DCI indicating one or more of the DMRS patterns based at least in part on a mapping between one or more of the set of DMRS patterns and one or more of the set of available CSI-RS resources that are associated with the one or more DMRS patterns. In some cases, such a mapping may be used by mapping manager 1330 to identify a first subset of CSI-RS resources that are mapped to the first DMRS pattern. Alternatively, such a mapping may be used to identify a first subset of DMRS patterns which may be precluded from DMRS transmissions, based in part on a CSI-RS configuration.

In some cases, mapping manager 1330 may determine first CSI-RS resources associated with the first downlink transmission based on the first subset of CSI-RS resources, determine a configuration of the CSI-RS resources based on an associated DMRS pattern, and determine frequency resources of the CSI-RS resources based on associated DMRS frequency resources. In some cases, the receiving the mapping further includes receiving one or more parameters for a same subset of CSI-RS resources for two or more DMRS patterns, at least one of the one or more parameters being different for different DMRS patterns. In some cases, the one or more parameters include one or more of a CSI-RS location, a CDM configuration for one or more antenna ports, a CSI-RS transmission size, or any combination thereof.

Reference signal receiver 1335 may receive one or more of a DMRS or CSI-RS based on the mapping. In some cases, the receiving the one or more of the DMRS or CSI-RS includes receiving a CSI-RS in a downlink transmission over the one or more CSI-RS resources mapped to the null DMRS configuration, and where a DMRS is not received in the downlink transmission.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
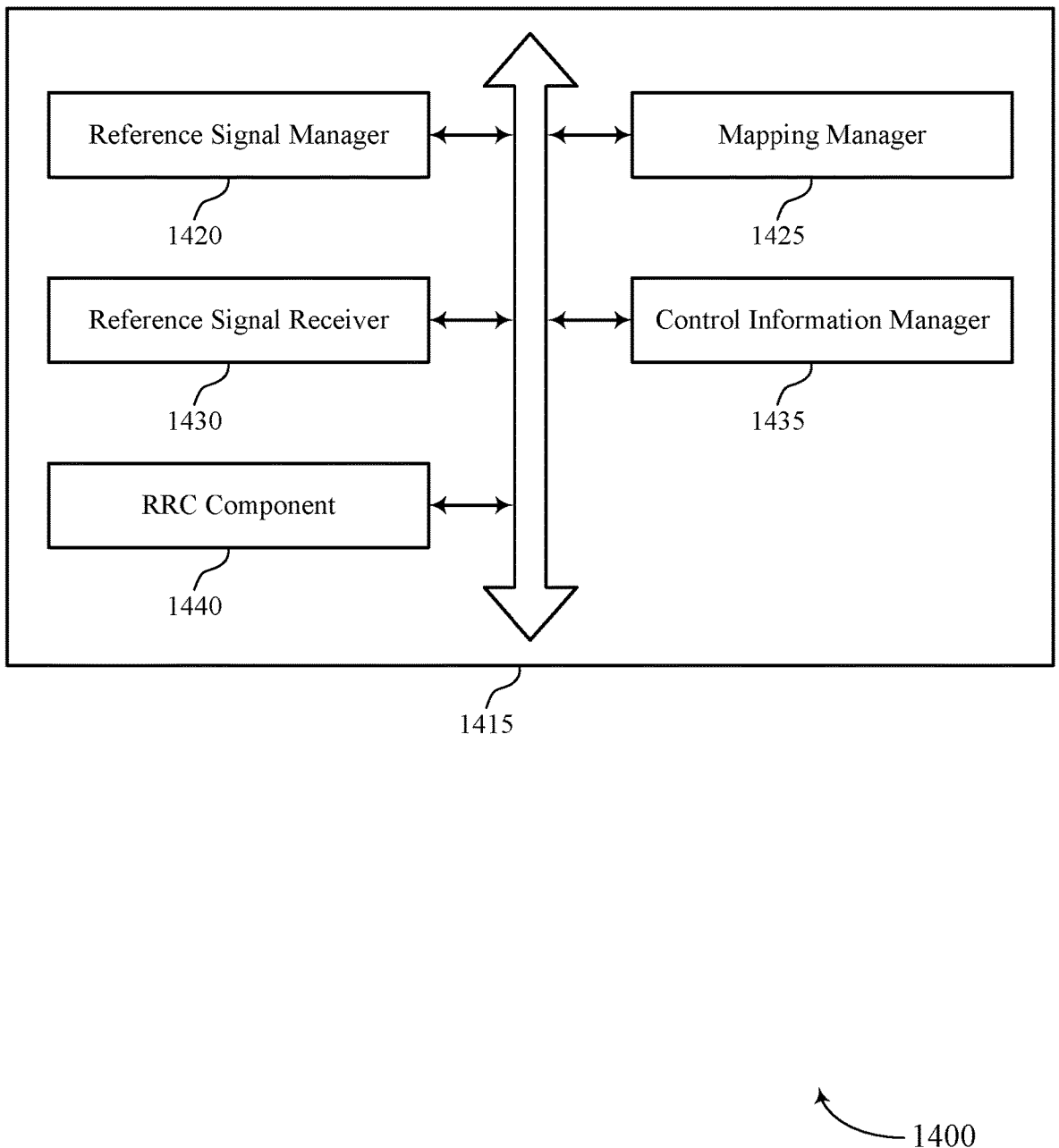

FIG. 14 shows a block diagram 1400 of a UE communications manager 1415 that supports joint determination of demodulation and channel state information reference signals in accordance with aspects of the present disclosure. The UE communications manager 1415 may be an example of aspects of a UE communications manager 1215, a UE communications manager 1315, or a UE communications manager 1515 described with reference to FIGS. 12, 13, and 15. The UE communications manager 1415 may include reference signal manager 1420, mapping manager 1425, reference signal receiver 1430, control information manager 1435, and RRC component 1440. Each of these modules may communicate, directly or indirectly, with one another (e.g., via one or more buses).

Reference signal manager 1420 may identify a set of DMRS patterns for use at a UE and a set of available CSI-RS resources. Reference signal manager 1420 may also receive an indication of a first DMRS pattern for a first downlink transmission, and receive an indication of one or more ZP CSI-RS resources that are configured independently of the DMRS patterns. In some cases, the set of DMRS patterns includes a null DMRS pattern mapped to one or more CSI-RS resources. In some cases, the set of null DMRS patterns are received in a cell-specific configuration of all UEs within a cell.

Mapping manager 1425 may receive DCI indicating one or more of the DMRS patterns based at least in part on a mapping between one or more of the set of DMRS patterns and one or more of the set of available CSI-RS resources that are associated with the one or more DMRS patterns. In some cases, such a mapping may be used by mapping manager 1425 to identify a first subset of CSI-RS resources that are mapped to the first DMRS pattern. Alternatively, such a mapping may be used to identify a first subset of DMRS patterns which may be precluded from DMRS transmissions, based in part on a CSI-RS configuration.

In some cases, mapping manager 1425 may determine first CSI-RS resources associated with the first downlink transmission based on the first subset of CSI-RS resources, determine a configuration of the CSI-RS resources based on an associated DMRS pattern, and determine frequency resources of the CSI-RS resources based on associated DMRS frequency resources. In some cases, the receiving the mapping further includes receiving one or more parameters for a same subset of CSI-RS resources for two or more DMRS patterns, at least one of the one or more parameters being different for different DMRS patterns. In some cases, the one or more parameters include one or more of a CSI-RS location, a CDM configuration for one or more antenna ports, a CSI-RS transmission size, or any combination thereof.

Reference signal receiver 1430 may receive one or more of a DMRS or CSI-RS based on the received DCI and the mapping. In some cases, the receiving the one or more of the DMRS or CSI-RS includes receiving a CSI-RS in a downlink transmission over the one or more CSI-RS resources mapped to the null DMRS configuration, and where a DMRS is not received in the downlink transmission.

Control information manager 1435 may receive an indication of the first CSI-RS resources within the first subset of CSI-RS resources in control information associated with the first downlink transmission. In some cases, the indication of the first CSI-RS resources is received dynamically in DCI associated with a downlink transmission.

RRC component 1440 may transmit and receive RRC signaling. In some cases, RRC component 1440 may semi-statically receive configuration information including the set of DMRS patterns and the set of available CSI-RS resources. In some cases, the configuration information is received in RRC signaling.

Figure 15:
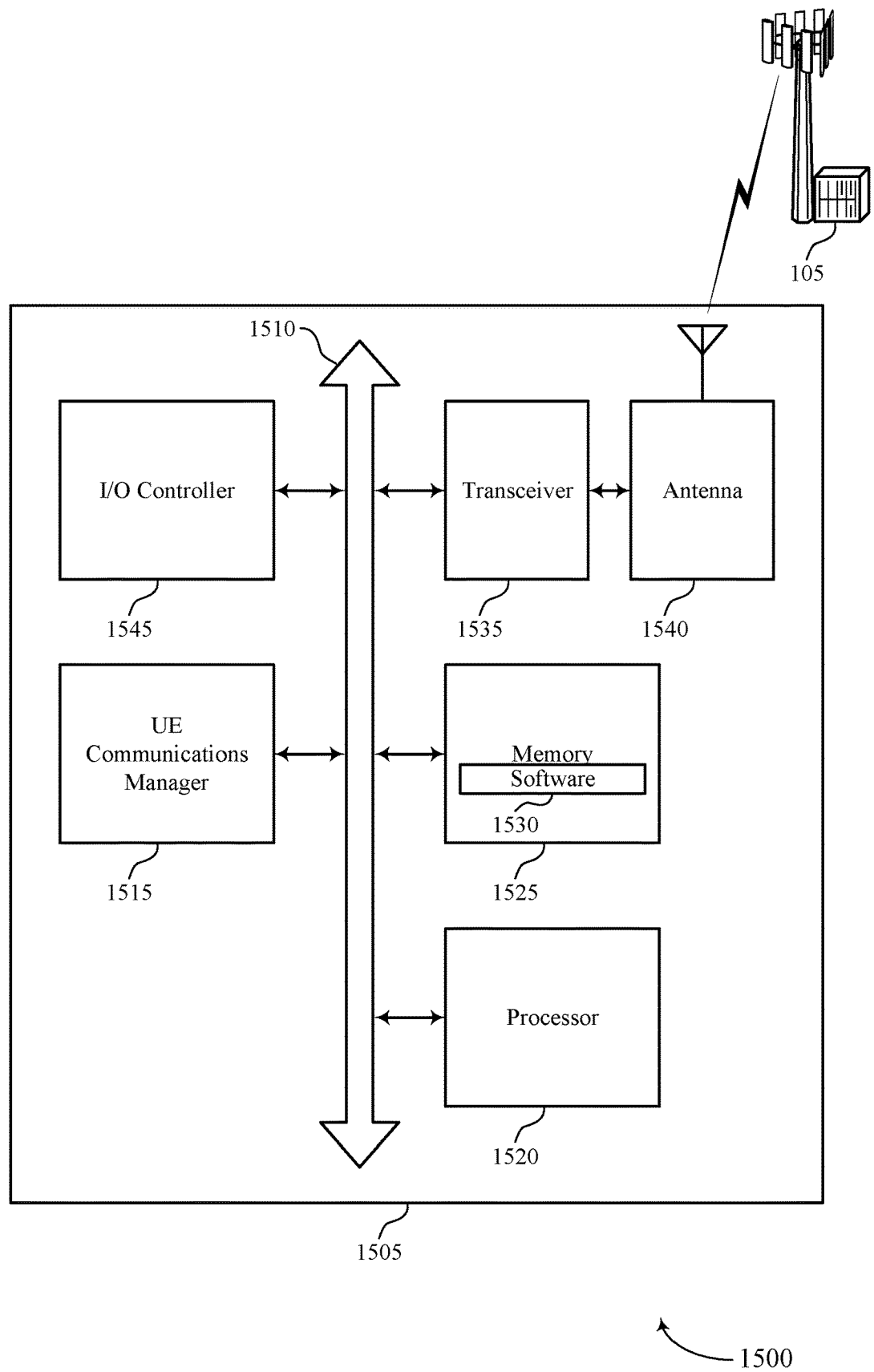
FIG. 15 illustrates a block diagram of a system including a UE that supports joint determination of demodulation and channel state information reference signals in accordance with aspects of the present disclosure.

FIG. 15 shows a diagram of a system 1500 including a device 1505 that supports joint determination of demodulation and channel state information reference signals in accordance with aspects of the present disclosure. Device 1505 may be an example of or include the components of wireless device 1205, wireless device 1305, or a UE 115 as described above, e.g., with reference to FIGS. 12 and 13. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting joint determination of demodulation and channel state information reference signals).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support joint determination of demodulation and channel state information reference signals. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases, the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
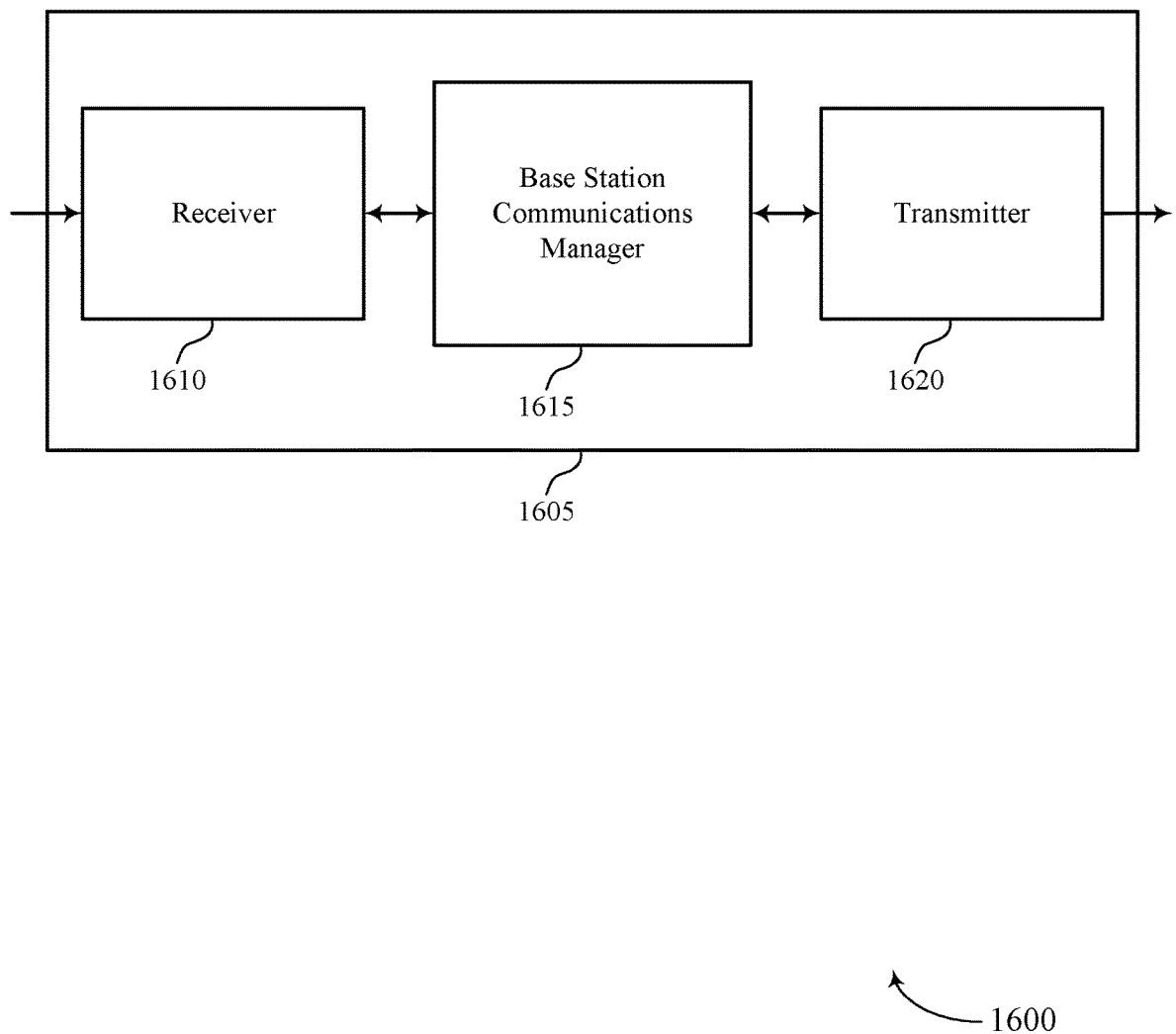
FIGS. 16 through 18 show block diagrams of a device that supports joint determination of demodulation and channel state information reference signals in accordance with aspects of the present disclosure.

FIG. 16 shows a block diagram 1600 of a wireless device 1605 that supports joint determination of demodulation and channel state information reference signals in accordance with aspects of the present disclosure. Wireless device 1605 may be an example of aspects of a base station 105 as described herein. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to joint determination of demodulation and channel state information reference signals, etc.). Information may be passed on to other components of the device. The receiver 1610 may be an example of aspects of the transceiver 1935 described with reference to FIG. 19. The receiver 1610 may utilize a single antenna or a set of antennas.

Base station communications manager 1615 may be an example of aspects of the base station communications manager 1915 described with reference to FIG. 19.

Base station communications manager 1615 and/or at least some of its various sub-components may be implemented in hardware, software executed by a processor, firmware, or any combination thereof. If implemented in software executed by a processor, the functions of the base station communications manager 1615 and/or at least some of its various sub-components may be executed by a general-purpose processor, a DSP, an ASIC, an FPGA or other programmable logic device, discrete gate or transistor logic, discrete hardware components, or any combination thereof, designed to perform the functions described in the present disclosure.

The base station communications manager 1615 and/or at least some of its various sub-components may be physically located at various positions, including being distributed such that portions of functions are implemented at different physical locations by one or more physical devices. In some examples, base station communications manager 1615 and/or at least some of its various sub-components may be a separate and distinct component in accordance with various aspects of the present disclosure. In other examples, base station communications manager 1615 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

Base station communications manager 1615 may identify a set of DMRS patterns for a UE and a set of available CSI-RS resources for the UE, determine a mapping between one or more of the DMRS patterns and one or more of the available CSI-RS resources, transmit DCI indicating one or more of the DMRS patterns based at least in part on the determined mapping, and transmit one or more of a DMRS or CSI-RS based on the transmitted DCI and the determined mapping.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
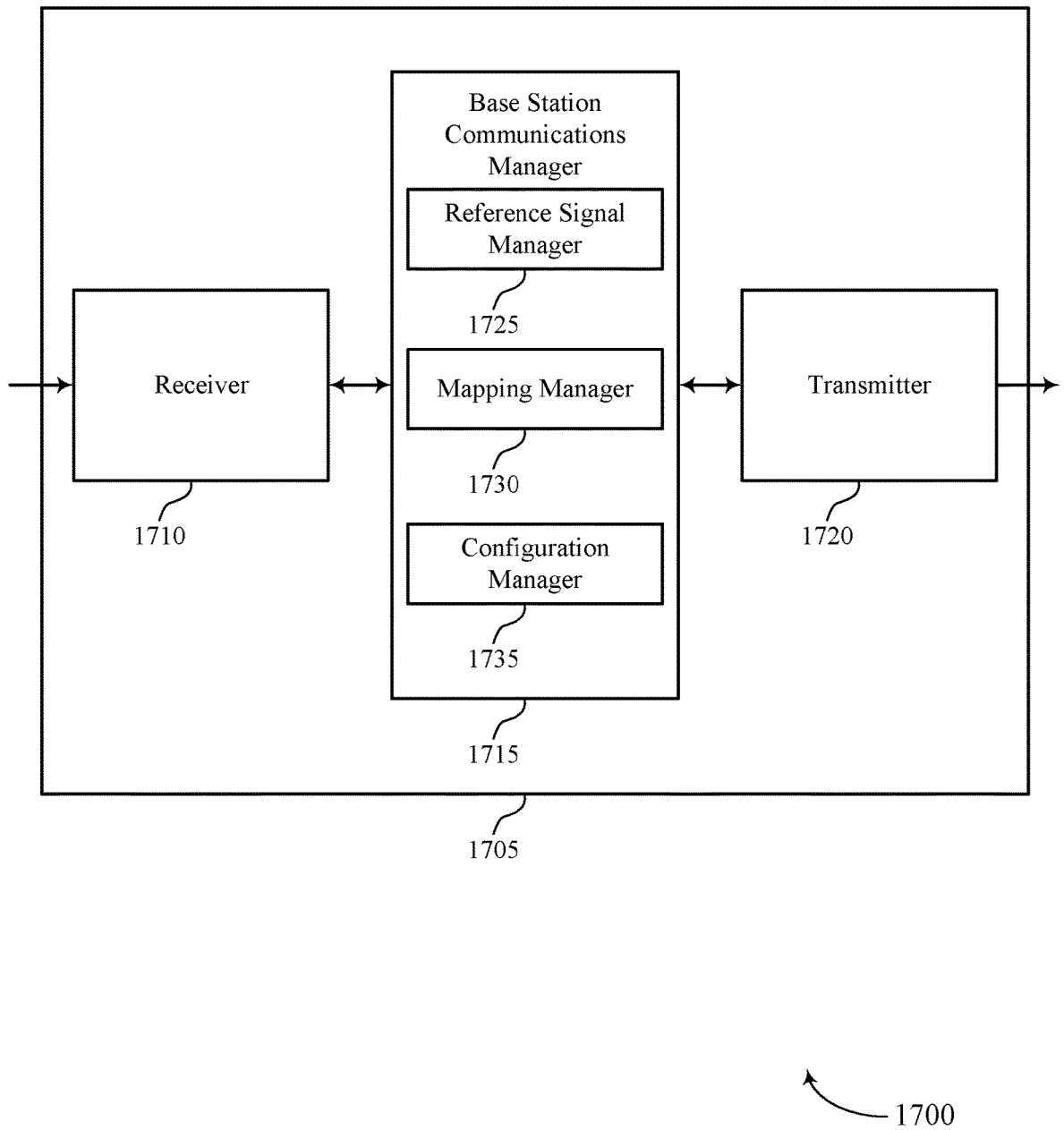

FIG. 17 shows a block diagram 1700 of a wireless device 1705 that supports joint determination of demodulation and channel state information reference signals in accordance with aspects of the present disclosure. Wireless device 1705 may be an example of aspects of a wireless device 1605 or a base station 105 as described with reference to FIG. 16. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to joint determination of demodulation and channel state information reference signals, etc.). Information may be passed on to other components of the device. The receiver 1710 may be an example of aspects of the transceiver 1935 described with reference to FIG. 19. The receiver 1710 may utilize a single antenna or a set of antennas.

Base station communications manager 1715 may be an example of aspects of the base station communications manager 1915 described with reference to FIG. 19. Base station communications manager 1715 may also include reference signal manager 1725, mapping manager 1730, and configuration manager 1735.

Reference signal manager 1725 may identify a set of DMRS patterns for a UE and a set of available CSI-RS resources for the UE, transmit an indication of a first DMRS pattern for a first downlink transmission, transmit an indication of the first CSI-RS resource, and transmit one or more of a DMRS or CSI-RS based on the transmitted DCI and the determined mapping. In some cases, reference signal manager 1725 may transmit a CSI-RS in a downlink transmission over the one or more CSI-RS resources mapped to a null DMRS pattern, and where a DMRS is not transmitted in the downlink transmission. In some cases, reference signal manager 1725 may determine a configuration of the CSI-RS based on an associated DMRS pattern, and determine frequency resources of the CSI-RS resources based on associated DMRS frequency resources. In some cases, the set of DMRS patterns includes a null DMRS pattern mapped to one or more CSI-RS resources. In some cases, the set of DMRS patterns includes a set of null DMRS patterns that are configured at a set of UEs in a cell-specific configuration.

Mapping manager 1730 may determine a mapping between one or more of the DMRS patterns and one or more of the available CSI-RS resources, identify a first subset of CSI-RS resources that are mapped to the first DMRS pattern, and select a first CSI-RS resource based on the first subset of CSI-RS resources that are mapped to the first DMRS pattern. In some cases, the determining the mapping between the one or more DMRS patterns and the subset of the CSI-RS resources further includes configuring one or more parameters for a same subset of CSI-RS resources for two or more DMRS patterns, at least one of the one or more parameters being different for different DMRS patterns. In some cases, the one or more parameters include one or more of a CSI-RS location, a CDM configuration for one or more antenna ports, a CSI-RS transmission size, or any combination thereof.

Configuration manager 1735 may transmit DCI indicating one or more of the DMRS patterns based at least in part on the determined mapping, and configure one or more ZP CSI-RS resources at the UE independently of the DMRS patterns.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
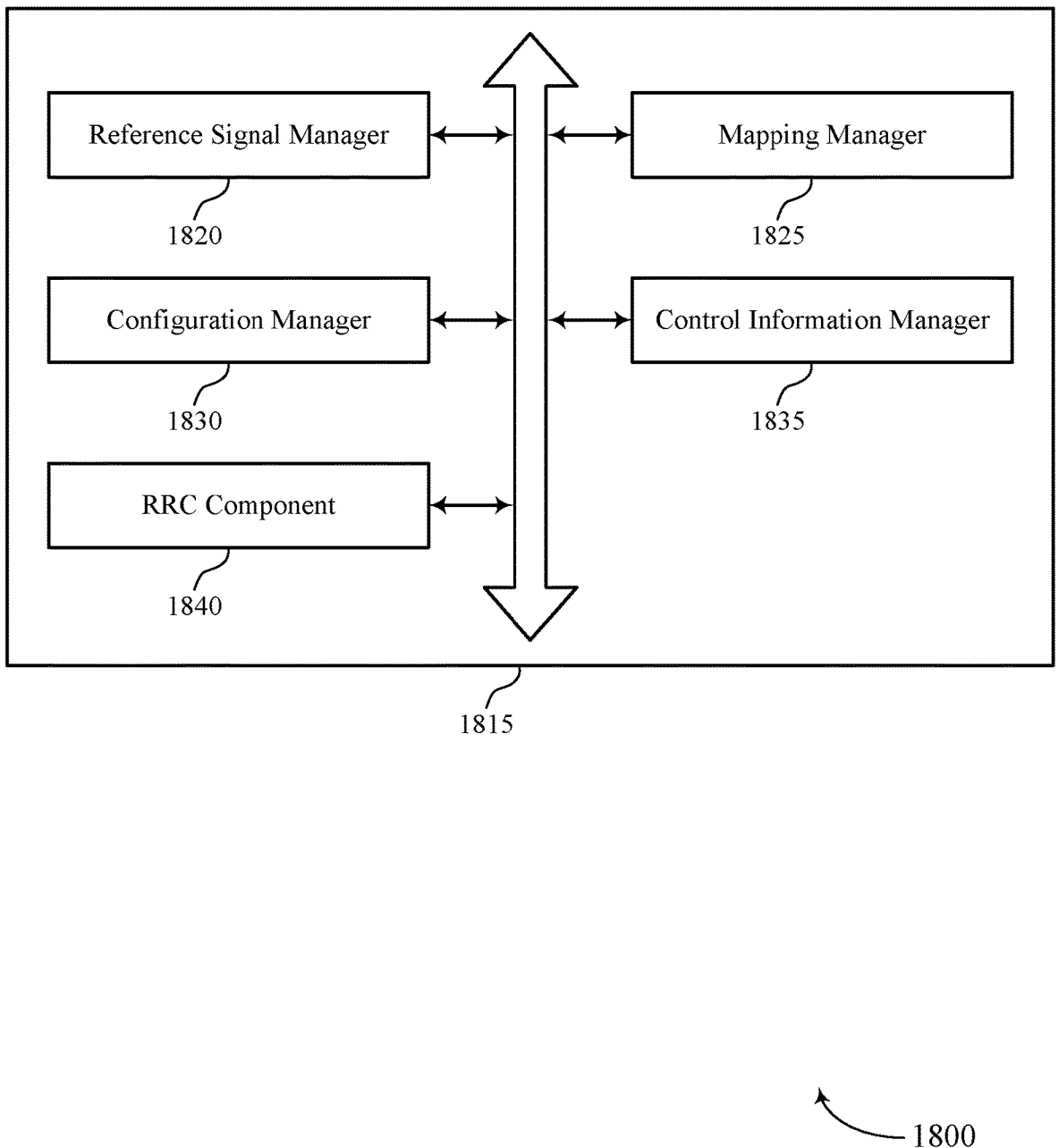

FIG. 18 shows a block diagram 1800 of a base station communications manager 1815 that supports joint determination of demodulation and channel state information reference signals in accordance with aspects of the present disclosure. The base station communications manager 1815 may be an example of aspects of a base station communications manager 1915 described with reference to FIGS. 16, 17, and 19. The base station communications manager 1815 may include reference signal manager 1820, mapping manager 1825, configuration manager 1830, control information manager 1835, and RRC component 1840. Each of these modules may communicate, directly or indirectly, with one another (e.g., via one or more buses).

Reference signal manager 1820 may identify a set of DMRS patterns for a UE and a set of available CSI-RS resources for the UE, transmit an indication of a first DMRS pattern for a first downlink transmission, transmit an indication of the first CSI-RS resource, and transmit one or more of a DMRS or CSI-RS based on the transmitted DCI and the determined mapping. In some cases, reference signal manager 1820 may transmit a CSI-RS in a downlink transmission over the one or more CSI-RS resources mapped to a null DMRS pattern, and where a DMRS is not transmitted in the downlink transmission. In some cases, reference signal manager 1820 may determine a configuration of the CSI-RS resources based on an associated DMRS pattern, and determine frequency resources of the CSI-RS resources based on associated DMRS frequency resources. In some cases, the set of DMRS patterns includes a null DMRS pattern mapped to one or more CSI-RS resources. In some cases, the set of DMRS patterns includes a set of null DMRS patterns that are configured at a set of UEs in a cell-specific configuration.

Mapping manager 1730 may determine a mapping between one or more of the DMRS patterns and one or more of the available CSI-RS resources, identify a first subset of CSI-RS resources that are mapped to the first DMRS pattern, and select a first CSI-RS resource based on the first subset of CSI-RS resources that are mapped to the first DMRS pattern. In some cases, the determining the mapping between the one or more DMRS patterns and the subset of the CSI-RS resources further includes configuring one or more parameters for a same subset of CSI-RS resources for two or more DMRS patterns, at least one of the one or more parameters being different for different DMRS patterns. In some cases, the one or more parameters include one or more of a CSI-RS location, a CDM configuration for one or more antenna ports, a CSI-RS transmission size, or any combination thereof.

Configuration manager 1830 may transmit DCI indicating one or more of the DMRS patterns based at least in part on the determined mapping, and configure one or more ZP CSI-RS resources at the UE independently of the DMRS patterns.

Control information manager 1835 may configure and transmit control information to one or more UEs. In some cases, the indication of the first CSI-RS resource is transmitted dynamically in DCI associated with the first downlink transmission.

RRC component 1840 may configure and transmit RRC signaling to one or more UEs. In some cases, the RRC component 1840 may semi-statically transmit in RRC signaling configuration information including the set of DMRS patterns and the set of available CSI-RS resources.

Figure 19:
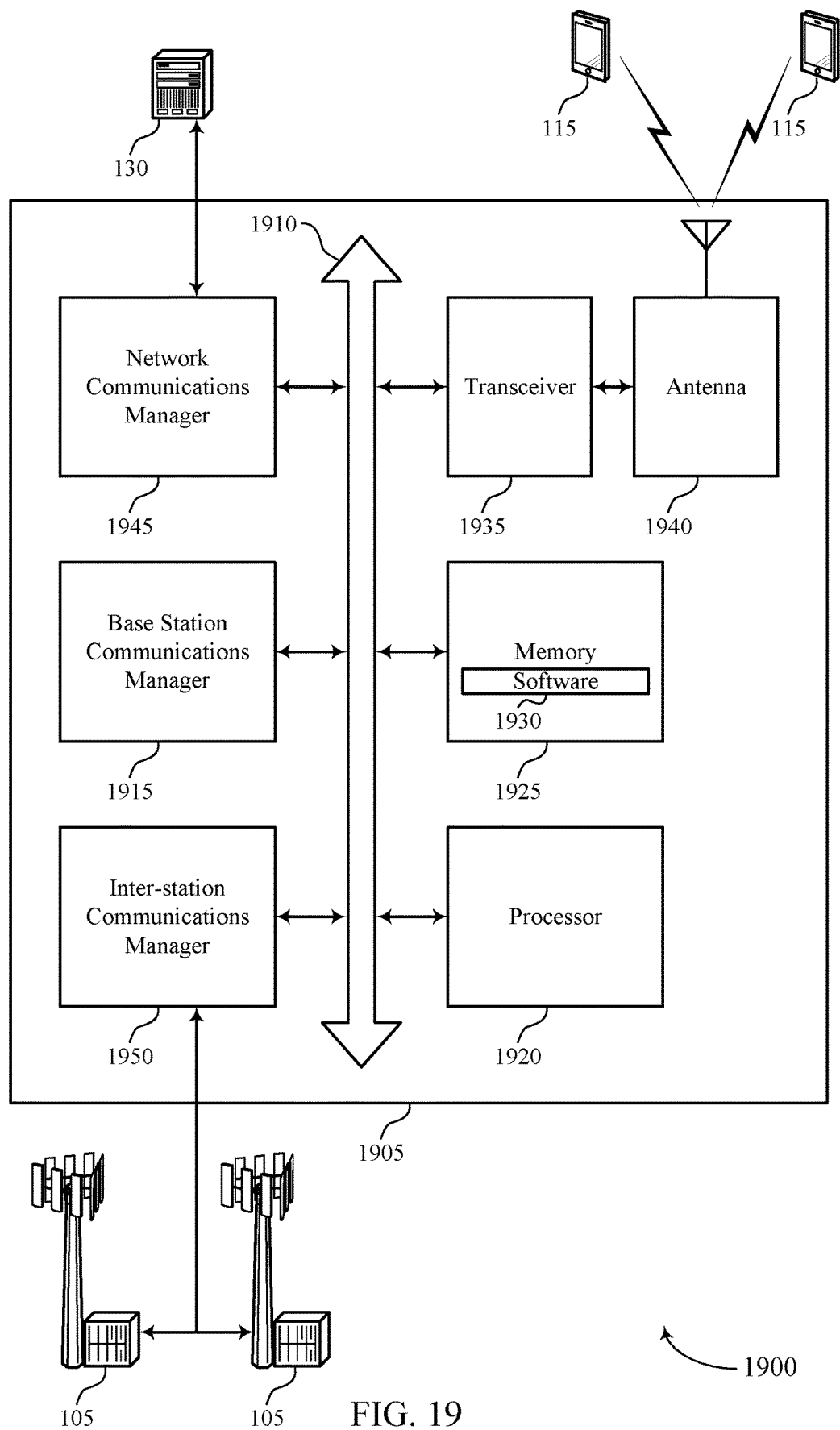
FIG. 19 illustrates a block diagram of a system including a base station that supports joint determination of demodulation and channel state information reference signals in accordance with aspects of the present disclosure.

FIG. 19 shows a diagram of a system 1900 including a device 1905 that supports joint determination of demodulation and channel state information reference signals in accordance with aspects of the present disclosure. Device 1905 may be an example of or include the components of base station 105 as described above, e.g., with reference to FIG. 1. Device 1905 may include components for bi-directional voice and data communications including components for transmitting and receiving communications, including base station communications manager 1915, processor 1920, memory 1925, software 1930, transceiver 1935, antenna 1940, network communications manager 1945, and inter-station communications manager 1950. These components may be in electronic communication via one or more buses (e.g., bus 1910). Device 1905 may communicate wirelessly with one or more UEs 115.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting joint determination of demodulation and channel state information reference signals).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware or software operation such as the interaction with peripheral components or devices.

Software 1930 may include code to implement aspects of the present disclosure, including code to support joint determination of demodulation and channel state information reference signals. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Inter-station communications manager 1950 may manage communications with other base station 105, and may include a controller or scheduler for controlling communications with UEs 115 in cooperation with other base stations 105. For example, the inter-station communications manager 1950 may coordinate scheduling for transmissions to UEs 115 for various interference mitigation techniques such as beamforming or joint transmission. In some examples, inter-station communications manager 1950 may provide an X2 interface within an Long Term Evolution (LTE)/LTE-A wireless communication network technology to provide communication between base stations 105.

Figure 20:
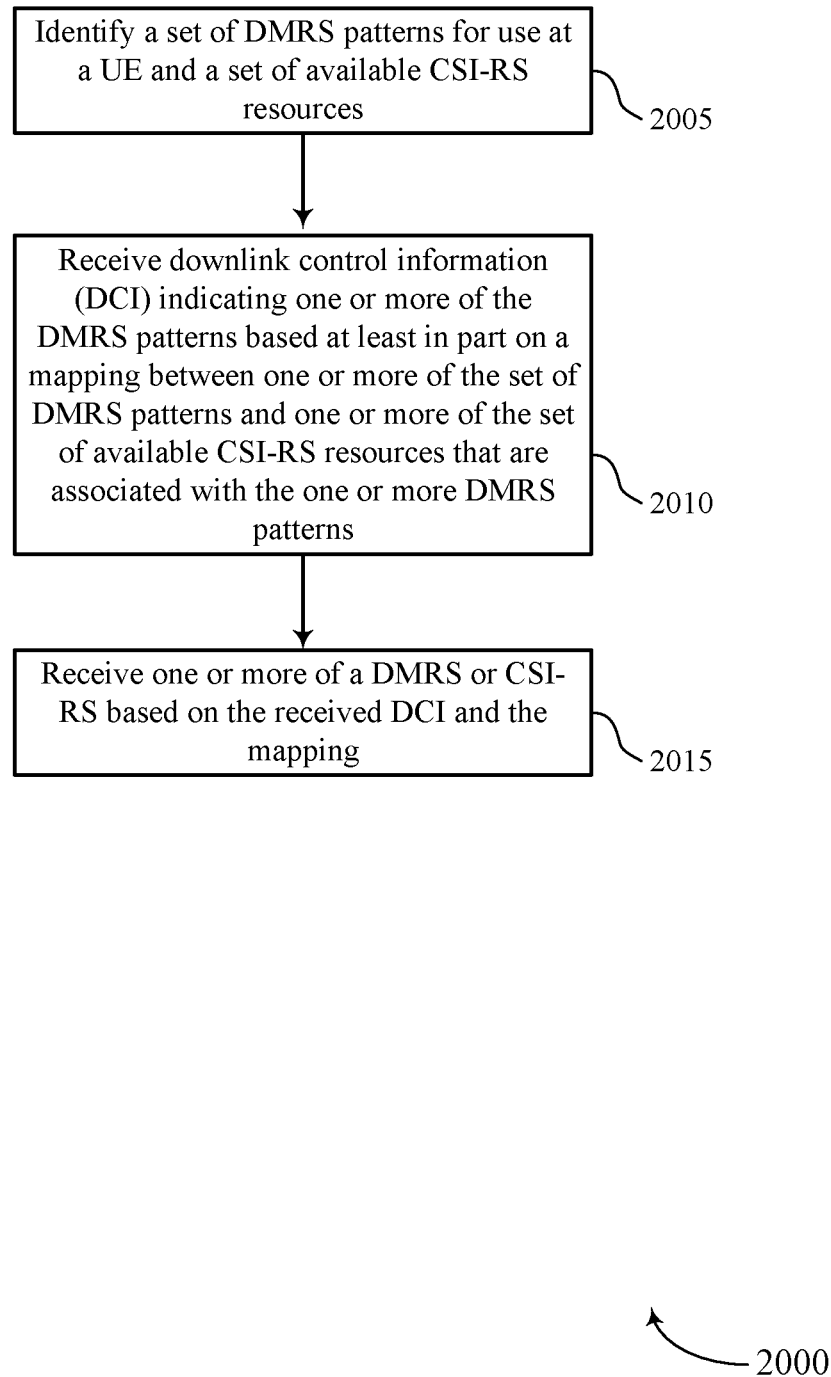
FIGS. 20 through 23 illustrate methods for joint determination of demodulation and channel state information reference signals in accordance with aspects of the present disclosure.

FIG. 20 shows a flowchart illustrating a method 2000 for joint determination of demodulation and channel state information reference signals in accordance with aspects of the present disclosure. The operations of method 2000 may be implemented by a UE 115 or its components as described herein. For example, the operations of method 2000 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At 2005, the UE 115 may identify a set of DMRS patterns for use at the UE and a set of available CSI-RS resources. The operations at 2005 may be performed according to the methods described herein. In certain examples, aspects of the operations at 2005 may be performed by a reference signal manager as described with reference to FIGS. 12 through 15.

At 2010, the UE 115 may receive DCI indicating one or more of the DMRS patterns based at least in part on a mapping between one or more of the set of DMRS patterns and one or more of the set of available CSI-RS resources that are associated with the one or more DMRS patterns. The operations at 2010 may be performed according to the methods described herein. In certain examples, aspects of the operations at 2010 may be performed by a mapping manager as described with reference to FIGS. 12 through 15.

At 2015, the UE 115 may receive one or more of a DMRS or CSI-RS based at least in part on the received DCI and the mapping. The operations at 2015 may be performed according to the methods described herein. In certain examples, aspects of the operations at 2015 may be performed by a reference signal receiver as described with reference to FIGS. 12 through 15.

Figure 21:
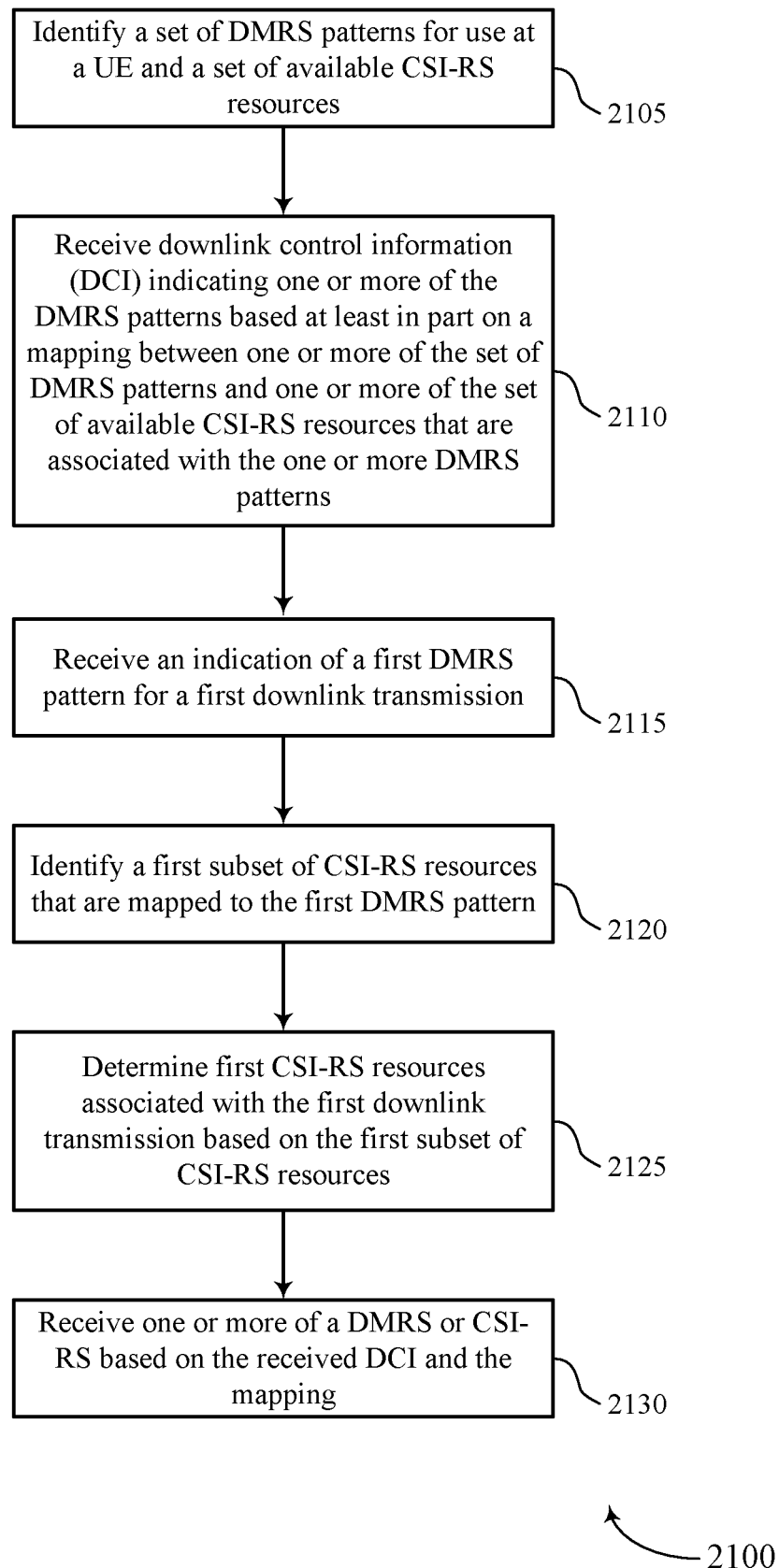

FIG. 21 shows a flowchart illustrating a method 2100 for joint determination of demodulation and channel state information reference signals in accordance with aspects of the present disclosure. The operations of method 2100 may be implemented by a UE 115 or its components as described herein. For example, the operations of method 2100 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At 2105, the UE 115 may identify a set of DMRS patterns for use at the UE and a set of available CSI-RS resources. The operations at 2105 may be performed according to the methods described herein. In certain examples, aspects of the operations at 2105 may be performed by a reference signal manager as described with reference to FIGS. 12 through 15.

At 2110, the UE 115 may receive DCI indicating one or more of the DMRS patterns based at least in part on a mapping between one or more of the set of DMRS patterns and one or more of the set of available CSI-RS resources that are associated with the one or more DMRS patterns. The operations at 2110 may be performed according to the methods described herein. In certain examples, aspects of the operations at 2110 may be performed by a mapping manager as described with reference to FIGS. 12 through 15.

At 2115, the UE 115 may receive an indication of a first DMRS pattern for a first downlink transmission. The operations at 2115 may be performed according to the methods described herein. In certain examples, aspects of the operations at 2115 may be performed by a reference signal manager as described with reference to FIGS. 12 through 15.

At 2120, the UE 115 may identify a first subset of CSI-RS resources that are mapped to the first DMRS pattern. The operations at 2120 may be performed according to the methods described herein. In certain examples, aspects of the operations at 2120 may be performed by a mapping manager as described with reference to FIGS. 12 through 15.

At 2125, the UE 115 may determine first CSI-RS resources associated with the first downlink transmission based at least in part on the first subset of CSI-RS resources. The operations at 2125 may be performed according to the methods described herein. In certain examples, aspects of the operations at 2125 may be performed by a mapping manager as described with reference to FIGS. 12 through 15.

At 2130, the UE 115 may receive one or more of a DMRS or CSI-RS based at least in part on the received DCI and the mapping. The operations at 2130 may be performed according to the methods described herein. In certain examples, aspects of the operations at 2130 may be performed by a reference signal receiver as described with reference to FIGS. 12 through 15.

Figure 22:
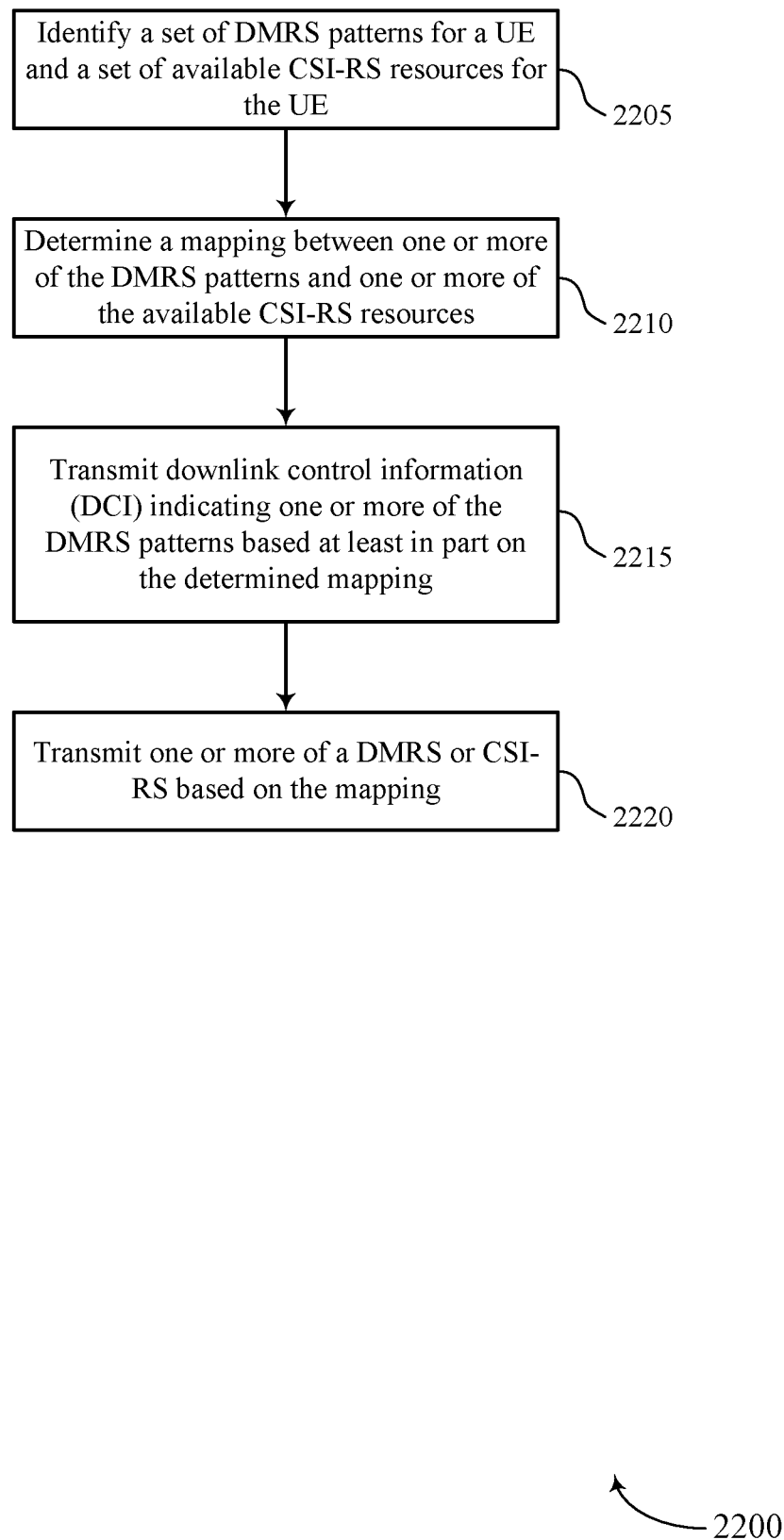

FIG. 22 shows a flowchart illustrating a method 2200 for joint determination of demodulation and channel state information reference signals in accordance with aspects of the present disclosure. The operations of method 2200 may be implemented by a base station 105 or its components as described herein. For example, the operations of method 2200 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At 2205, the base station 105 may identify a set of DMRS patterns for a UE and a set of available CSI-RS resources for the UE. The operations at 2205 may be performed according to the methods described herein. In certain examples, aspects of the operations at 2205 may be performed by a reference signal manager as described with reference to FIGS. 16 through 19.

At 2210, the base station 105 may determine a mapping between one or more of the DMRS patterns and one or more of the available CSI-RS resources. The operations at 2210 may be performed according to the methods described herein. In certain examples, aspects of the operations at 2210 may be performed by a mapping manager as described with reference to FIGS. 16 through 19.

At 2215, the base station 105 may transmit DCI indicating one or more of the DMRS patterns based at least in part on the determined mapping. The operations at 2215 may be performed according to the methods described herein. In certain examples, aspects of the operations at 2215 may be performed by a configuration manager as described with reference to FIGS. 16 through 19.

At 2220, the base station 105 may transmit one or more of a DMRS or CSI-RS based at least in part on the transmitted DCI and the determined mapping. The operations at 2220 may be performed according to the methods described herein. In certain examples, aspects of the operations at 2220 may be performed by a reference signal manager as described with reference to FIGS. 16 through 19.

Figure 23:
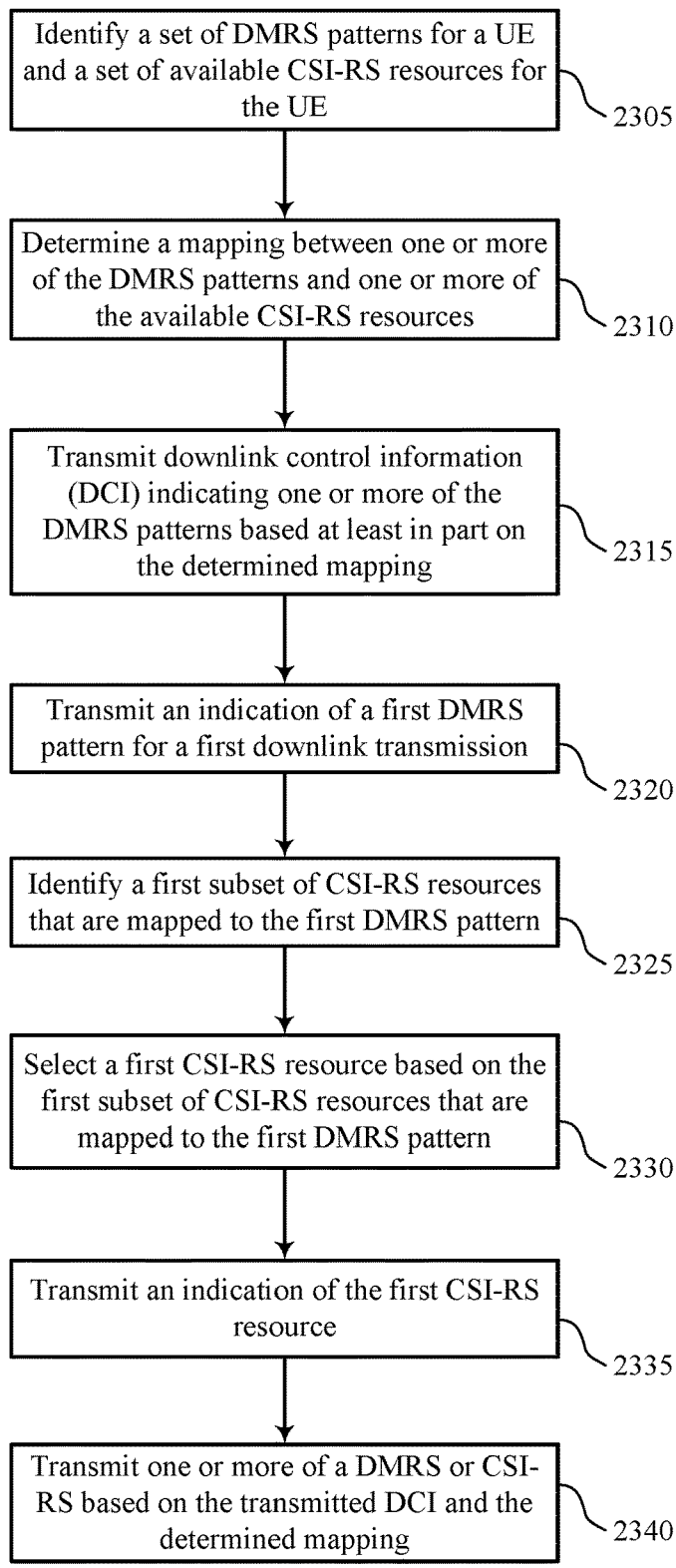

FIG. 23 shows a flowchart illustrating a method 2300 for joint determination of demodulation and channel state information reference signals in accordance with aspects of the present disclosure. The operations of method 2300 may be implemented by a base station 105 or its components as described herein. For example, the operations of method 2300 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At 2305, the base station 105 may identify a set of DMRS patterns for a UE and a set of available CSI-RS resources for the UE. The operations at 2305 may be performed according to the methods described herein. In certain examples, aspects of the operations at 2305 may be performed by a reference signal manager as described with reference to FIGS. 16 through 19.

At 2310, the base station 105 may determine a mapping between one or more of the DMRS patterns and one or more of the available CSI-RS resources. The operations at 2310 may be performed according to the methods described herein. In certain examples, aspects of the operations at 2310 may be performed by a mapping manager as described with reference to FIGS. 16 through 19.

At 2315, the base station 105 may transmit DCI indicating one or more of the DMRS patterns based at least in part on the determined mapping. The operations at 2315 may be performed according to the methods described herein. In certain examples, aspects of the operations at 2315 may be performed by a configuration manager as described with reference to FIGS. 16 through 19.

At 2320, the base station 105 may transmit an indication of a first DMRS pattern for a first downlink transmission. The operations at 2320 may be performed according to the methods described herein. In certain examples, aspects of the operations at 2320 may be performed by a reference signal manager as described with reference to FIGS. 16 through 19.

At 2325, the base station 105 may identify a first subset of CSI-RS resources that are mapped to the first DMRS pattern. The operations at 2325 may be performed according to the methods described herein. In certain examples, aspects of the operations at 2325 may be performed by a mapping manager as described with reference to FIGS. 16 through 19.

At 2330, the base station 105 may select a first CSI-RS resource based at least in part on the first subset of CSI-RS resources that are mapped to the first DMRS pattern. The operations at 2330 may be performed according to the methods described herein. In certain examples, aspects of the operations at 2330 may be performed by a mapping manager as described with reference to FIGS. 16 through 19.

At 2335, the base station 105 may transmit an indication of the first CSI-RS resource. The operations at 2335 may be performed according to the methods described herein. In certain examples, aspects of the operations at 2335 may be performed by a reference signal manager as described with reference to FIGS. 16 through 19.

At 2340, the base station 105 may transmit one or more of a DMRS or CSI-RS based at least in part on the transmitted DCI and the determined mapping. The operations at 2340 may be performed according to the methods described herein. In certain examples, aspects of the operations at 2340 may be performed by a reference signal manager as described with reference to FIGS. 16 through 19.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    semi-statically receiving radio resource control (RRC) signaling including configuration information indicating a set of DMRS resource patterns and a set of CSI-RS resources, each of the CSI-RS resources being associated with a slot of a plurality of slots;
    receiving, in a first slot of the plurality of slots, downlink control information (DCI) indicating a first DMRS pattern of the set of DMRS patterns; and
    receiving, in the first slot, a DMRS in the first DMRS pattern and a CSI-RS in a first CSI-RS resource associated with the first slot based on a mapping between the DMRS patterns of the set of DMRS patterns and the CSI-RS resources of the set of CSI-RS resources, the mapping precluding overlap between DMRS patterns of the set of DMRS patterns and CSI-RS resources of the set of CSI-RS resources.

2. A user equipment (UE), comprising:
a processor;
memory in electronic communication with the processor; and
instructions stored in the memory and operable, when executed by the processor, to cause the apparatus to:
semi-statically receive radio resource control (RRC) signaling including configuration information indicating a set of DMRS resource patterns and a set of CSI-RS resources, each of the CSI-RS resources being associated with a slot of a plurality of slots;
receive, in a first slot of the plurality of slots, downlink control information (DCI) indicating a first DMRS pattern of the set of DMRS patterns; and
receive, in the first slot, a DMRS in the first DMRS pattern and a CSI-RS in a first CSI-RS resource associated with the first slot based on a mapping between the DMRS patterns of the set of DMRS patterns and the CSI-RS resources of the set of CSI-RS resources, the mapping precluding overlap between DMRS patterns of the set of DMRS patterns and CSI-RS resources of the set of CSI-RS resources.

3. A method for wireless communication at a base station, comprising:
semi-statically transmitting radio resource control (RRC) signaling including configuration information indicating a set of DMRS resource patterns and a set of CSI-RS resources, each of the CSI-RS resources being associated with a respective slot of a plurality of slots;
enabling a first DMRS pattern of the set of DMRS patterns for transmission to a user equipment (UE) in a first slot of a plurality of slots;
determining a first subset of CSI-RS resources, of the set of CSI-RS resources, available for transmission in the first slot based on a mapping between the DMRS patterns of the set of DMRS patterns and the CSI-RS resources of the set of CSI-RS resources, the mapping precluding overlap between DMRS patterns of the set of DMRS patterns and CSI-RS resources of the set of CSI-RS resources;
transmitting, in the first slot, downlink control information (DCI) indicating the first DMRS pattern; and
transmitting, in the first slot, a DMRS in the first DMRS pattern and a CSI-RS in a first CSI-RS resource of the first subset of CSI-RS resources.

4. A base station, comprising:
a processor;
memory in electronic communication with the processor; and
instructions stored in the memory and operable, when executed by the processor, to cause the apparatus to:
semi-statically transmit radio resource control (RRC) signaling including configuration information indicating a set of DMRS resource patterns and a set of CSI-RS resources, each of the CSI-RS resources being associated with a respective slot of a plurality of slots;
enable a first DMRS pattern of the set of DMRS patterns for transmission to a user equipment (UE) in a first slot of a plurality of slots;
determine a first subset of CSI-RS resources, of the set of CSI-RS resources, available for transmission in the first slot based on a mapping between the DMRS patterns of the set of DMRS patterns and the CSI-RS resources of the set of CSI-RS resources, the mapping precluding overlap between DMRS patterns of the set of DMRS patterns and CSI-RS resources of the set of CSI-RS resources;
transmit, in the first slot, downlink control information (DCI) indicating the first DMRS pattern; and
transmit, in the first slot, a DMRS in the first DMRS pattern and a CSI-RS in a first CSI-RS resource of the first subset of CSI-RS resources.

* * * * *